United States Patent
Koutaki et al.

(10) Patent No.: US 8,004,582 B2
(45) Date of Patent: Aug. 23, 2011

(54) IMAGE FILE PROCESSING APPARATUS, IMAGE FILE PROCESSING METHOD, AND STORAGE MEDIUM

(75) Inventors: Kayo Koutaki, Kunitachi (JP); Takuya Yamada, Hamura (JP); Jun Hosoda, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 414 days.

(21) Appl. No.: 12/331,778

(22) Filed: Dec. 10, 2008

(65) Prior Publication Data

US 2009/0153701 A1 Jun. 18, 2009

(30) Foreign Application Priority Data

Dec. 14, 2007 (JP) ................................. 2007-323343
Mar. 31, 2008 (JP) ................................. 2008-091268

(51) Int. Cl.
*H04N 5/76* (2006.01)
(52) U.S. Cl. ............. 348/231.2; 348/231.99; 348/231.6; 348/231.9
(58) Field of Classification Search ............ 348/231.99, 348/231.2, 231.3, 231.6, 231.9; 382/282, 382/302, 305
See application file for complete search history.

(56) References Cited

U.S. PATENT DOCUMENTS

| | | | | |
|---|---|---|---|---|
| 5,581,311 A * | 12/1996 | Kuroiwa | ..................... | 348/231.2 |
| 5,724,579 A | 3/1998 | Suzuki | | |
| 6,335,742 B1 * | 1/2002 | Takemoto | ..................... | 715/781 |
| 7,480,002 B2 * | 1/2009 | Goh et al. | ................. | 348/333.05 |
| 7,683,942 B2 * | 3/2010 | Tsujii et al. | ................. | 348/231.2 |
| 2002/0060740 A1 * | 5/2002 | Kato | ............................. | 348/232 |
| 2004/0109062 A1 * | 6/2004 | Yamaya | ..................... | 348/207.1 |
| 2005/0259163 A1 * | 11/2005 | Tsujii et al. | ................. | 348/231.2 |
| 2006/0188176 A1 | 8/2006 | Sawano | | |
| 2006/0284994 A1 * | 12/2006 | Kim | ........................... | 348/231.2 |
| 2009/0207279 A1 * | 8/2009 | Ochi et al. | ............... | 348/231.99 |

FOREIGN PATENT DOCUMENTS

| | | |
|---|---|---|
| JP | 7-245723 A | 9/1995 |
| JP | 9-307811 A | 11/1997 |
| JP | 2000-76276 A | 3/2000 |
| JP | 2000-261756 A | 9/2000 |
| JP | 2006-229680 A | 8/2006 |
| JP | 2006-238311 A | 9/2006 |

OTHER PUBLICATIONS

Japanese Office Action dated Nov. 10, 2009 and English translation thereof issued in a counterpart Japanese Application No. 2007-323343.

Japanese Office Action dated Jan. 12, 2010 and English translation thereof issued in a counterpart Japanese Application No. 2008-091268.

* cited by examiner

*Primary Examiner* — Nhan T Tran
*Assistant Examiner* — Tuan H Le
(74) *Attorney, Agent, or Firm* — Holtz, Holtz, Goodman & Chick, PC

(57) ABSTRACT

An image file processing apparatus comprises a first storage unit configured to store an image, a first data creating unit configured to create main image data or sub-image data, a second storage unit configured to store the main image data and the sub-image data as one file, a management region setting unit configured to ensure management information of the sub-image data stored in the same file as the main image data in the second storage unit by a predetermined number and set the management information in a management region of the main image data, and a storage control unit configured to control so as to store the file based upon content set by the management region setting unit.

35 Claims, 15 Drawing Sheets

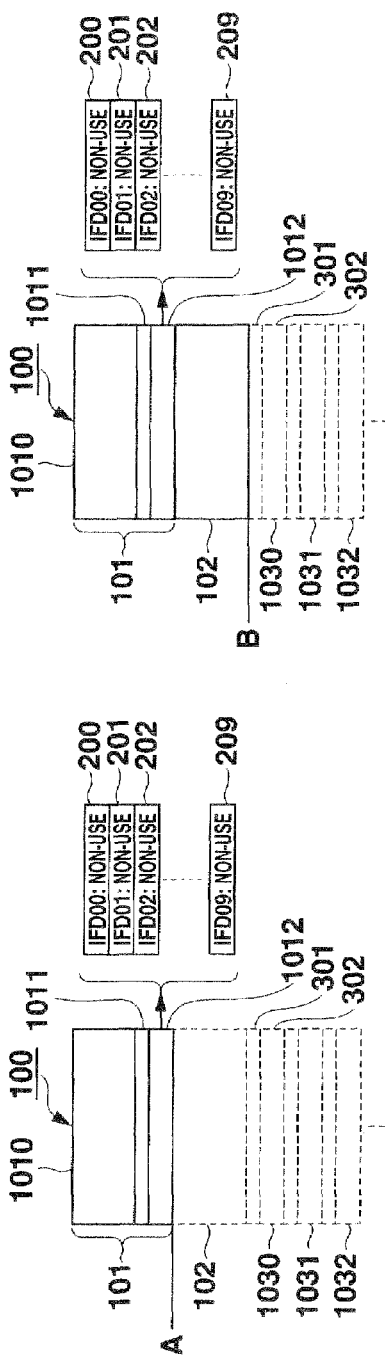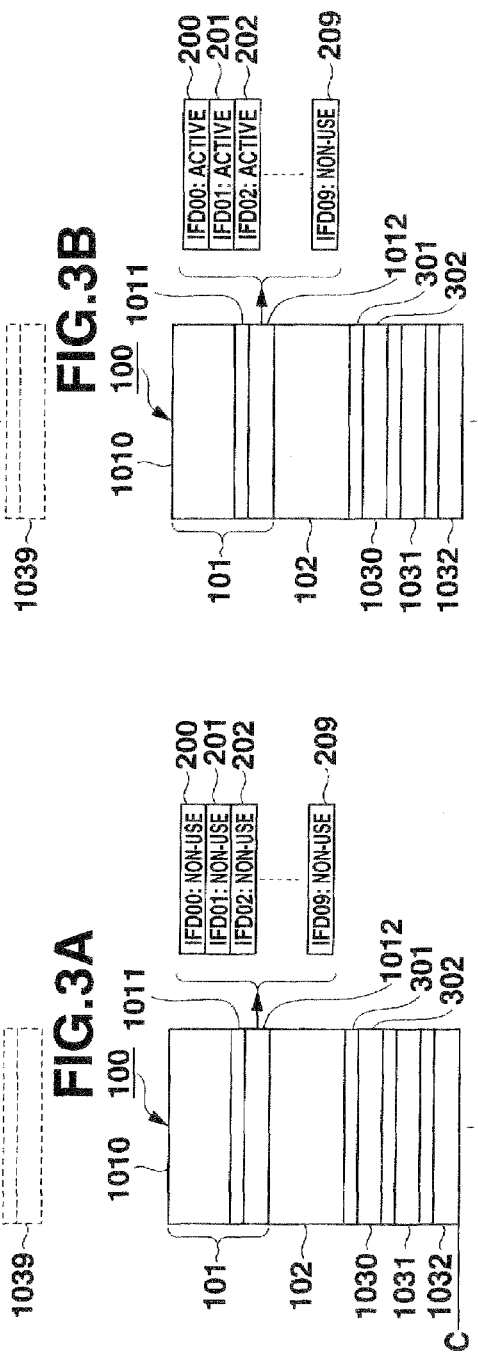

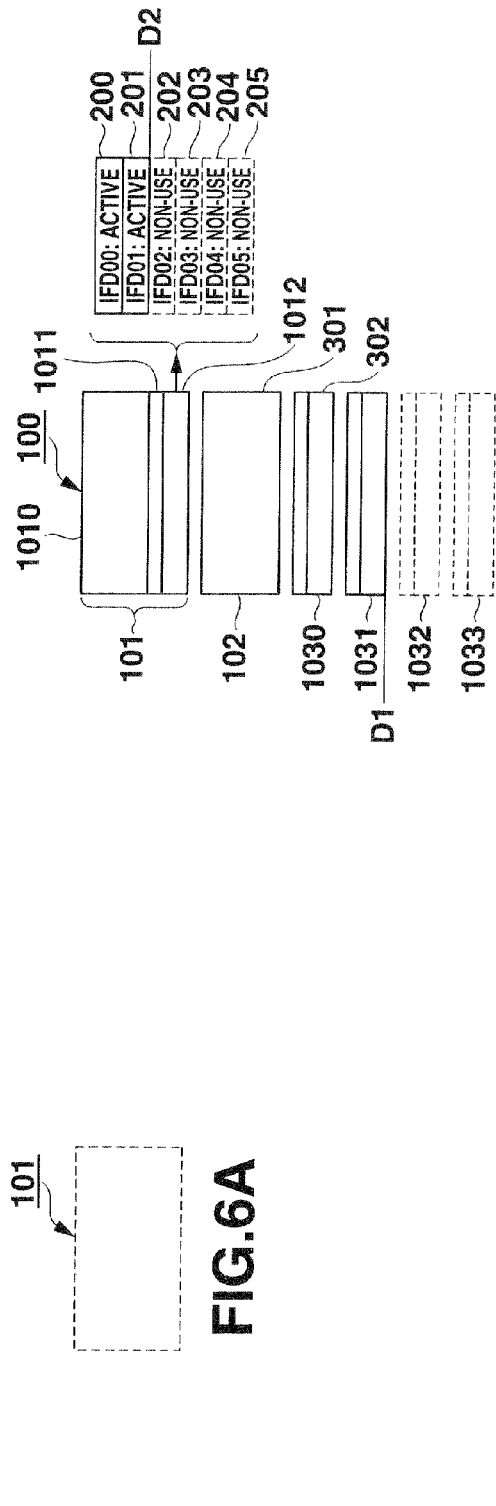
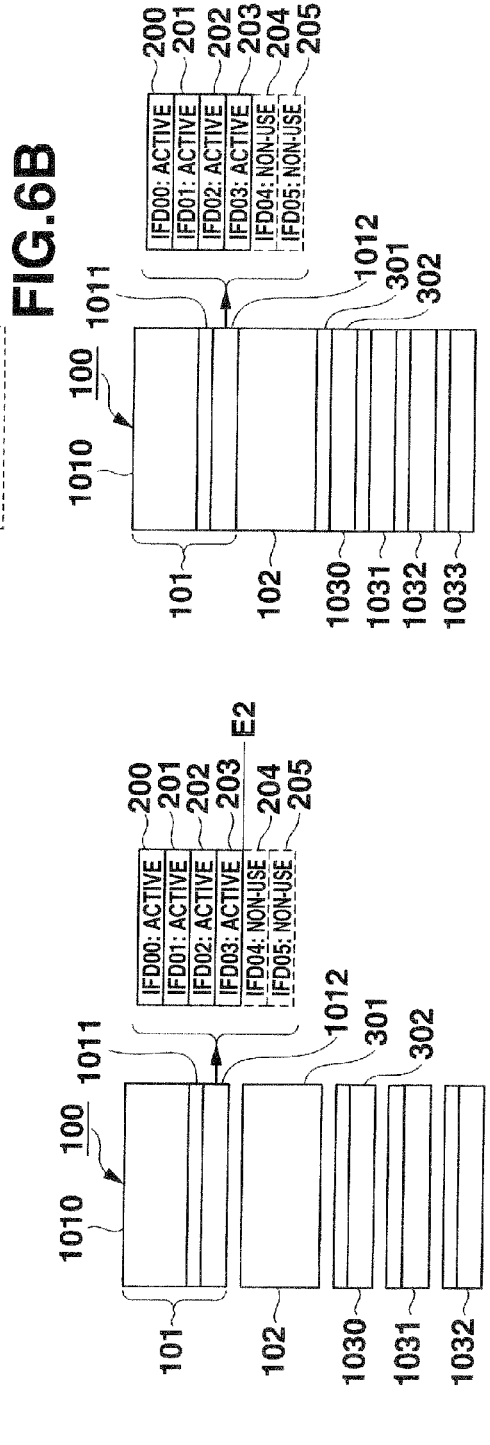

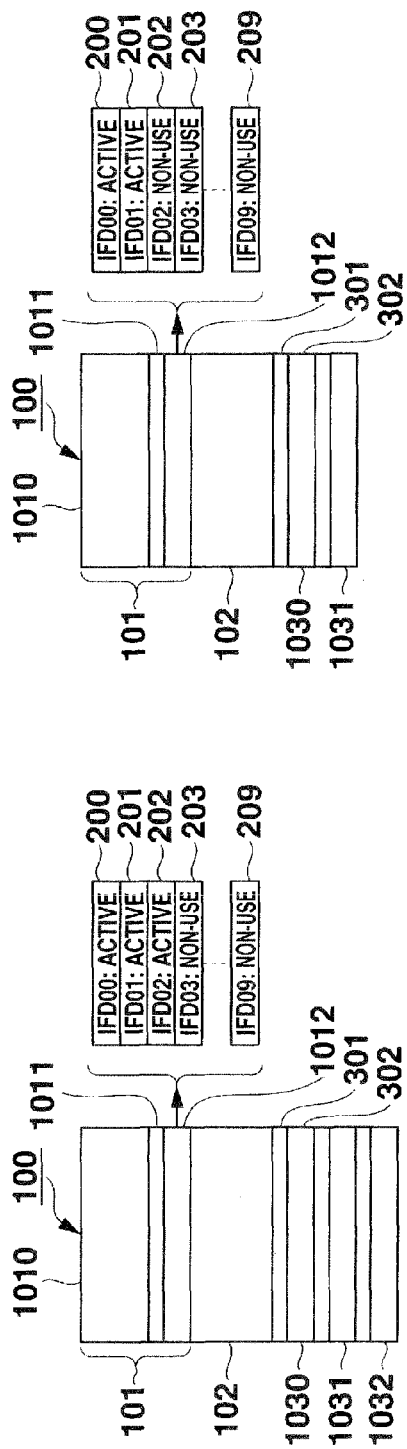
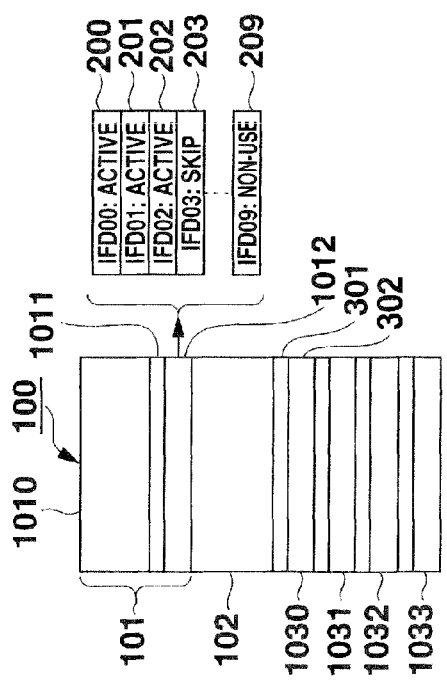
FIG.13A  FIG.13B  FIG.13C

IMAGE FILE PROCESSING APPARATUS, IMAGE FILE PROCESSING METHOD, AND STORAGE MEDIUM

CROSS-REFERENCE TO RELATED APPLICATIONS

This application is based upon and claims the benefit of priority from prior Japanese Patent Applications No. 2007-323343, filed Dec. 14, 2007; and No. 2008-091268, filed Mar. 31, 2008, the entire contents of both of which are incorporated herein by reference.

BACKGROUND OF THE INVENTION

1. Field of the Invention

The present invention relates to an image file processing apparatus, an image file processing method, and a storage medium which process an image file in which a photo image has been recorded.

2. Description of the Related Art

When an image is recorded as a file in an apparatus, such as an imaging apparatus, it is conventionally common to configure the image in a file utilizing the Design Rule Camera File System Standard (DCF Standard) or a file system compliant with Exif (Exchangeable Image File Format for Digital Camera) format used together with the DCF Standard.

Various improvement technologies have been devised to a process up to configuring the file. As one example, such a technology has been devised that, when main image data, non-compressed sub-image data, and compressed sub-image data are created and recorded in a memory card, a transfer time of image data to the memory card is accelerated for the main image data having a predetermined size or less by storing the main image data and the compressed sub-image data without storing the non-compressed sub-image data (Jpn. Pat. Appln. KOKAI Pub. No. 2000-261756).

As described above, regarding the file-configuring technology for an image, various technologies for improvement have been proposed.

However, the conventional file-configuring technology has been proposed based upon only main image data and sub-image data being contained in the same file for a single image. For example, regarding a plurality of continuous photo images, a panorama image created by synthesizing two or three images, and a plurality of images captured in multiple view-point directions, image files are created by the same number as the number of the images. Therefore, when the image files are managed collectively, a troublesome task for creating a management region other than the created image files in the memory to obtain association of the plurality of image files in the management region is required.

BRIEF SUMMARY OF THE INVENTION

An object of the present invention is to facilitate storing processing of a file including main image data and sub-image data regarding a photo image.

According to an embodiment of the present invention, an image file processing apparatus comprises: an imaging unit; a first storage unit configured to store an image imaged by the imaging unit;

a first data creating unit configured to create at least main image data and sub-image data from the image stored in the first storage unit;

a second storage unit configured to store the at least main image data and sub-image data created by the first data creating unit as one file;

a management region setting unit configured to ensure management information of the sub-image data stored in the same file as the main image data in the second storage unit by a predetermined number and set the management information in a management region of the main image data; and a first storage control unit configured to perform control so as to store the file based upon content set by the management region setting unit when the file is to be stored in the second storage unit.

According to another embodiment of the present invention, an image file processing method comprises:

a first storage step for storing an image into a first memory;

a first data creating step for creating at least main image data and sub-image data from the image stored by the first storage step;

a second storage step for storing the at least main image data and sub-image data created by the first data creating step as one file into a second memory; and a management region setting step for ensuring management information of the sub-image data stored in the same file as the main image data by the second storage step by a predetermined number and setting the management information in a management region of the main image data, and the second storage step stores the file based upon content set by the management region setting step when the file is to be stored in the second memory.

According to another embodiment of the present invention, a computer-readable storage medium stores a program for causing a computer provided in an image file processing apparatus to function as:

first storage means for storing an image into a first memory;

first data creating means for creating at least main image data and sub-image data from the image stored by the first storage step;

second storage means for storing the at least main image data and sub-image data created by the first data creating step as one file into a second memory; and management region setting means for ensuring management information of the sub-image data stored in the same file as the main image data by the second storage means by a predetermined number and setting the management information in a management region of the main image data, and first storage control means for performing control so as to store the file based upon content set by the management region setting means when the file is to be stored in the second storage means.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3A is a diagram showing a file configuration at a time point of step SA3 of the flowchart of FIG. 2;

FIG. 3B is a diagram showing a file configuration at a time point of step SA6 of the flowchart of FIG. 2;

FIG. 3C is a diagram showing a file configuration at a time point of step SA7 of the flowchart of FIG. 2;

FIG. 3D is a diagram showing a file configuration at a time point of step SA8 of the flowchart of FIG. 2;

FIG. 6A is a diagram showing a file configuration at a time point of step SA23 of the flowchart of FIG. 5;

FIG. 6B is a diagram showing a file configuration during step SA25 of the flowchart of FIG. 5;

FIG. 6C is a diagram showing a file configuration at a time point of step SA25 of the flowchart of FIG. 5;

FIG. 6D is a diagram showing a file configuration at a time point of step SA26 (Yes) of the flowchart of FIG. 5;

FIG. 13A is a diagram showing a file configuration before step SC4 of the flowchart of FIG. 11;

FIG. 13B is a diagram showing a file configuration at a time point of step SC9 of the flowchart of FIG. 11;

FIG. 13C is a diagram showing a file configuration at a time point of step SC12 of the flowchart of FIG. 11;

DETAILED DESCRIPTION OF THE INVENTION

An embodiment of an image file processing apparatus according to the present invention will now be described with reference to the accompanying drawings.

A. Circuit Configuration

Figure 1:
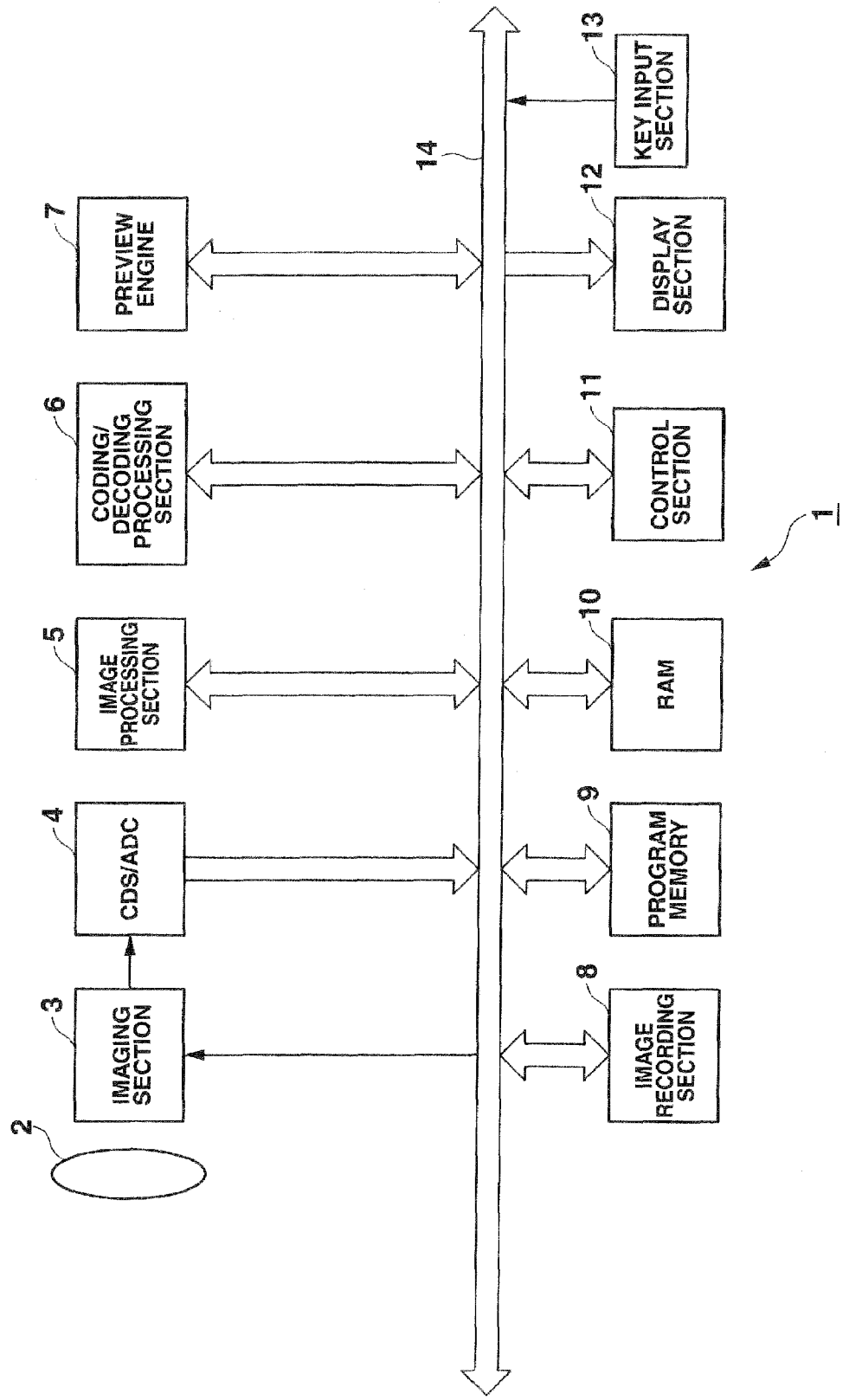
FIG. 1 is a circuit configuration diagram of an imaging apparatus according to one embodiment of the present invention.

FIG. 1 is a block diagram showing a schematic configuration of an imaging apparatus 1 serving as an image file processing apparatus. The imaging apparatus 1 comprises a control section 11 connected to respective sections via a bus line 14. The control section 11 is a one chip microcomputer which controls respective sections of the image file processing apparatus 1.

In FIG. 1, an imaging lens 2 comprises a lens unit including optical system members.

An imaging section 3 comprises an image sensor such as a CMOS that is disposed on an optical axis of the imaging lens 2. A unit circuit 4 is a circuit in which an analog imaging signal corresponding to an optical image of a subject output from the imaging section 3, and comprises a correlation double sampling (CDS) circuit holding an input imaging signal, an automatic gain control (ACC) amplifier amplifying the imaging signal, an A/D converter (ADC) converting the amplified imaging signal to a digital imaging signal, and the like.

An output signal of the imaging section 3 is sent to an image processing section 5 via the unit circuit 4 as a digital signal to be subjected to each image processing and subjected to reduction processing at a preview engine 7 and is supplied to a display section 12. When the supplied digital signal (imaging signal) and a drive control signal driving a driver incorporated in the display section 12 are input into the display section 12, the display section 12 displays an image based upon the digital signal (imaging signal) as a through image on a lower layer.

At an image recording time, the signal processed in the image processing section 5 is compressed and coded at a coding/decoding processing section 6 to be configured as a file in a file format described later and recorded in an image recording section 8, while, at an image reproducing time, main image data and sub-image data contained in the image file read from the image recording section 8 are decoded at the cording/decoding section 6 to be displayed on the display section 12.

The preview engine 7 performs control required when an image just before being recorded in the image recording section 8 at an image recording time is displayed on the display section 12 in addition to creation of the above-mentioned through image. A key input section 13 comprises a shutter key, a cursor key, a decision key, a clear key, and the like.

The bus line 14 is connected with a RAM 10 temporarily storing data for processing, or an intermediate file and a program memory 9. The program memory 9 stores a program for performing the processing shown in flowcharts, described later, therein.

B1. Imaging and New File Creation Processing

Next, a processing from an imaging processing to a file creation in the imaging apparatus 1 will be explained.

Figure 2:
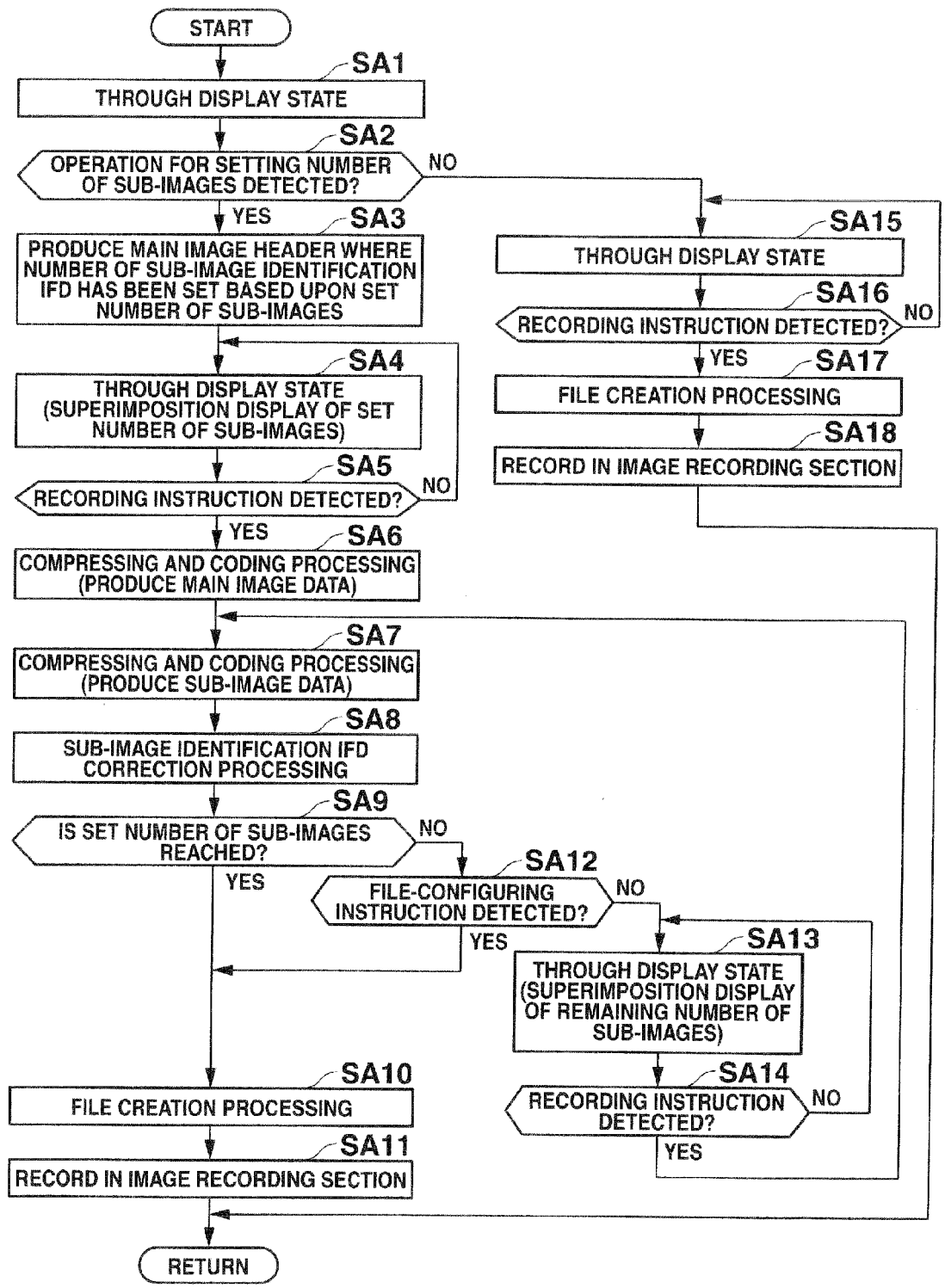
FIG. 2 is a flowchart of an imaging and new file creation processing according to the embodiment of the present invention.

FIG. 2 is a flowchart showing a processing from photographing (imaging) to recording to the image recording section 8.

When activation of an imaging mode is instructed according to a predetermined operation detected in the key input section 13, the control section 11 reads a program relating to an imaging processing from the program memory 9 to execute the same, thereby causing the imaging section 3, the unit circuit 4, the image processing section 5, the RAM 10, the coding/decoding processing section 6, and the preview engine 7 to perform initial actions (start state).

Based upon an image focused on the imaging section 3 via the imaging lens 2, conversion to a digital signal in the unit circuit 4 and processing to image data in the image signal processing section 5 are cyclically performed so that video (images) obtained is displayed on the display section 12 in a live view manner (step SA1).

In the live view display state, the control section 11 determines whether or not an operation for setting the number of sub-images has been detected according to a predetermined operation detected by the key input section 13 (step SA2). When the operation for setting the number of sub-images has not been detected (step SA2: No), the control section 11 proceeds to the live view display state again (step SA15), and the control section 11 waits for detection of a recording instruction of an image focused on the imaging section 3 (step SA16). When a recording instruction is detected (step SA16: Yes), image data corresponding to an image focused at the imaging section 3 at the time is temporarily stored in the RAM 10. Thereafter, the coding/decoding processing section 6 creates a file of a format compliant with the DCF Standard (Exif format) under control of the control section 11 (step SA17) and records the created file in the image recording section 8 (step SA18), so that the control section 11 returns back to the live view display state.

When the operation for stetting the number of sub-images is detected (step SA2: Yes), the control section 11 sets the number of sub-image identification IFD (Image File Directory) setting regions based upon the set number of sub-images and adds it to a main image header (step SA3). A detailed technical explanation including file creation will be explained with reference to FIGS. 3A to 3D.

After the number of sub-images has been set, the set number of sub-images is displayed together with the image displayed in the live view display state (step SA4).

Figure 4A:
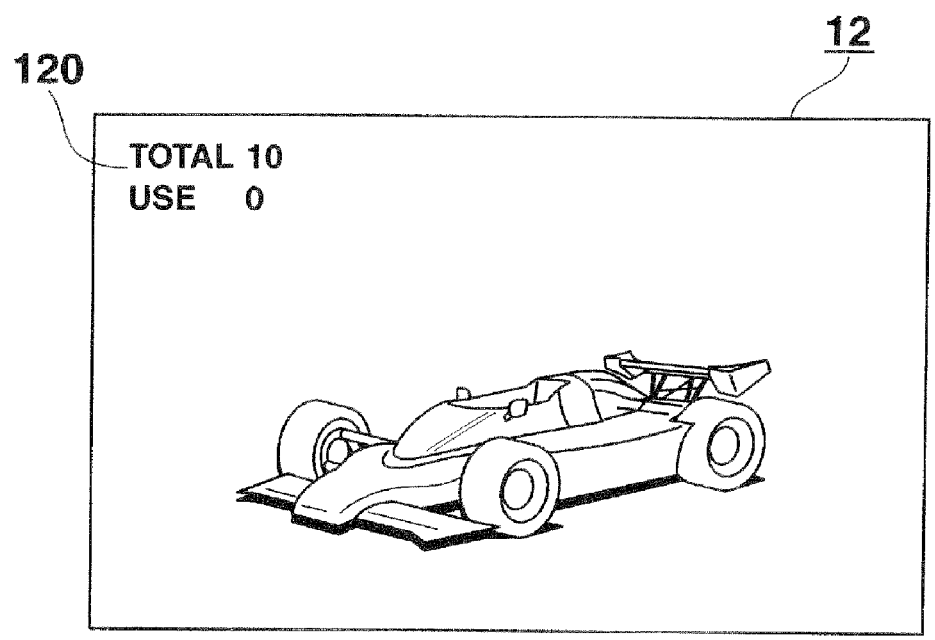
FIG. 4A is a diagram showing a display example at a time point of step SA4 of the flowchart of FIG. 2.

FIG. 4A shows a display state on the display section 12 at this time. In FIG. 4A, the number of sub-images set in an information display region 120 (the number of sub-image data) is defined as "Total" and the recorded number of sub-images (the number of sub-image data) is defined as "Use", and the respective numbers are displayed on the display section 12 together with a video image of a racing car. In FIG. 4A, display is performed such that the number of sub-images is 10 (the number of sub-image identification IFD setting regions is 10) and the number of recorded sub-images is 0 (the number of recorded sub-image identification IFD setting regions is 0).

In the live view display state, the control section 11 waits for detection of a recording instruction of an image focused on the imaging section 3 (step SA5), and when the recording instruction is detected (step SA5: Yes), image data corresponding to an image focused on the imaging section 3 at this time is temporarily stored in the RAM 10. Thereafter, the coding/decoding processing section 6 performs compressing and decoding processing (creation of main image data) under control of the control section 11 (step SA6).

The coding/decoding processing section 6 performs compressing and coding processing (creation of sub-image data) on an image focused at the imaging section 3 or image data temporarily stored in the RAM 10 by the preset number of sub-images according to other operations other than the above-mentioned setting operation, or an imaging program stored in the program memory 9 (step SA7).

The above-mentioned other operations include, for example, an operation for performing continuous photographing, a panorama photographing operation, a multi-view point (multi-angle) photographing operation, and the like.

The imaging programs stored in the program memory 9 include a program for performing photographing by a predetermined number of times automatically or a program for performing photographing while switching various photographing conditions such as an exposure value, a shutter speed, a white balance or the like, automatically.

The processing for performing creation of sub-image data of image data temporarily stored in the RAM 10 includes, for example, a processing for creating, of image data stored temporarily, other image data where a resolution, a storage capacity, a storage size, or a compression ratio has been changed.

When creation of the above-mentioned sub-image data is finished, the control section 11 corrects the number of sub-image identification IFD setting regions set (created) in the main image header at step SA3 from "Non-use" to "Active (recorded)" by the number of created sub-image data to perform associating of SOI markers of created sub-image data (information indicating a head of data) (step SA8).

The control section 11 determines whether or not sub-images have been recorded by the preset number of the sub-images at step SA3, namely, all of the sub-image identification IFD setting regions have been changed to "Active" (step SA9). When it is determined that all of the sub-image identification IFD setting regions are "Active" (step SA9: Yes), the control section 11 performs a creating processing of a file including the main image data header, the main image data, and the sub-image data (step SA10) and records the created and processed file in the image recording section 8 (step SA11) to return back to the live view display state.

When it is determined that all of the sub-image identification IFD setting regions are not "Active" (step SA9: No), the control section 11 waits for file-configuring instruction detection based upon operation detection of the key input 13 without performing file creation immediately (step SA12). When the file-configuring instruction is detected (step SA12: Yes), the control section 11 performs a file-configuring processing at step SA10, but when the file-configuring instruction is not detected (step SA12: No), the control section 11 displays the set number of sub-images, the recorded number of sub-images, and the non-used number of sub-images (the remaining number of sub-images) together with an image on the display section 12 in the live view display state (step SA13).

Figure 4B:
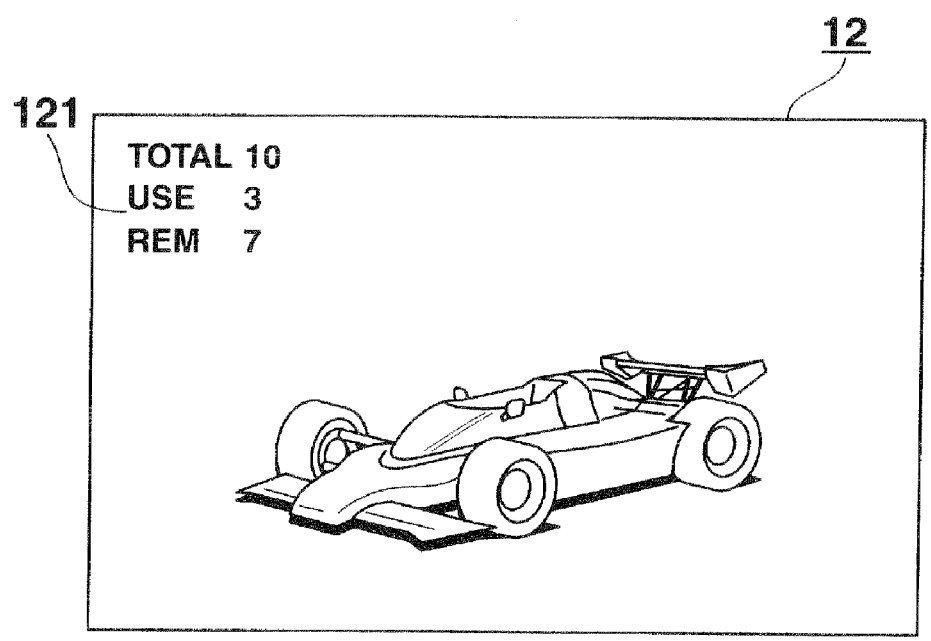
FIG. 4B is a diagram showing a display example at a time point of step SA13 of the flowchart of FIG. 2.

FIG. 4B shows a display state of the display section 12 at this time. In FIG. 4B, the number of sub-images set in the information display region 121 (the number of sub-image data) is defined as "Total", the number of recorded sub-images (the number of sub-image data) is defined as "Use", and the number of recordable sub-images (the number of sub-image data) is defined as "REM" in addition thereto, and the respective numbers together with a video of a racing car are displayed on the display section 12, respectively. In FIG. 4B, display is made such that the number of sub-images is 10 (the number of recorded sub-image identification IFD setting regions is 10), the number of recorded sub-images is 3 (the number of recorded sub-image identification IFD setting regions is 3), and the number of recordable sub-images is 7 (the number of recorded sub-image identification IFD setting regions is 7).

In the live view display state, the control section 11 waits for detection of a recording instruction (step SA14), and when the recording instruction is detected (step SA14: Yes), the control section 11 returns back to step SA7 and the coding/decoding processing section 6 performs a compressing and coding processing (creation of sub-image data) regarding an image focused on the imaging section 3 or image data temporarily stored in the RAM 10 by the preset number of sub-images according to an operator's operation different from the above-mentioned setting operation, or an imaging program stored in the program memory 9.

Next, a creation process of a file according to the above-mentioned flowchart will be explained in detail with reference to FIGS. 4A and 4B.

FIGS. 3A to 3D shows file configurations during a creation process according to the flowchart shown in FIG. 2.

In FIGS. 3A to 3D, the file takes a format compliant with the above-mentioned DCF Standard (Exif format), but it is different from the DCF Standard in that the main image header includes a management region for sub-image data and one or plural sub-image data are included in association with the main image data.

A file 100 comprises a main image header 101, a main image data setting region 102, and sub-image data setting regions 1030, 1031, 1032, . . . 1039. The main image header 101 includes a basis information setting region 1010, a thumbnail image data setting region 1011, and an image index IFD 1012. Exif essential tags such as a maker name and a model name of an image input device, creation date and hour of original image data, creation date and hour of digital data, compatibility identification index, and version, which are compliant with Exif format, are set in the basis information setting region 1010. Thumbnail image data of main image data is set in the thumbnail image data setting region 1011. The image index IFD 1012 includes information managing the number of the sub-image data and sub-image index IFD tag and manages sub-image identification IFD setting regions 200 to 209. The sub-image identification IFD setting regions 200 to 209 themselves are each provided with regions storing sub-image kind, sub-image data offset, sub-image unique ID, dependent sub-image identification IFD, and Offset of Next IDF therein.

The main image data is written in the main image data setting region 102. A sub-image header 301 and a sub-image data setting region 302 are written in each of the sub-image data setting regions 1030 to 1039. Thumbnail image data of a sub-image, sub-image attribute information, and an Exif essential tag of single sub-image data are set in the sub-image header 301. Since the thumbnail image data is set in the sub-image header 301, it is assumed that a size of the sub-image data itself must be substantially larger than a size (120 long×160 wide) of thumbnail image data.

The content illustrated in FIG. 3A shows a time point of step SA3 of the flowchart shown in FIG. 2. That is, when the number of sub-images is set at step SA3, the number of sub-image identification IFD setting regions is set in the image index IFD 1012 based upon setting of the number of sub-images. When the number of sub-images is set to 10, the number of sub-image identification IFD setting regions becomes 10, such as from 200 to 209, so that "Non-use" is set in these sub-image identification IFD Nos. (IFD00 to IFD09). A setting region (up to line A) of the main image header 101 including the image index IFD 1012 is ensured, and a file configuration assuming that at most 10 sub-image data have been created along the above-mentioned setting operation (corresponding to a region illustrated by a broken line in FIG. 3C) is temporarily determined.

The content illustrated in FIG. 3B shows a time point of step SA6 of the flowchart shown in FIG. 2. That is, when the main image data is created at step SA6, thumbnail image data of the main image data is written in the thumbnail image data setting region 1011 and the main image data is written in the main image data setting region 102, so that a region up to this region (line B) is ensured.

The content illustrated in FIG. 3C shows a time point of step SA7 of the flowchart shown in FIG. 2. That is, when sub-image data (for example, three data) is created at step SA7, the sub-image data is written in three regions of the respective sub-image data setting regions 1030 to 1032. That is, regarding the three sub-images, thumbnail image data is written in a region where thumbnail image data of the sub-image header 301 is set and each sub-image data is written in the sub-image data setting region 302, so that a region up to this region (line C) is ensured.

The content illustrated in FIG. 3D shows a time point of step SA8 of the flowchart shown in FIG. 2. That is, when the sub-image data is written at step SA7, a configuration of a file in which the main image data and the sub-image data are included has been determined at that time point (corresponding to a region illustrated by a solid line in FIG. 3C), so that "Non-use" in the sub-image identification IFD setting regions (IFD00 to IFD02) are corrected to "Active", with which respective SOI markers of the sub-image data are associated.

When a file is created at step SA10, the file is created in a region illustrated by a solid line in FIG. 3D and is recorded in the image recording section 8.

Thus, according to the flowchart, such an effect can be obtained that, when a file in which sub-image data is included is created by the imaging apparatus, by setting the number of sub-image data (the number of sub-images) preliminarily, the burden required for file construction performed thereafter can be reduced.

Such an effect can be obtained that, when the number of sub-image data recorded during photographing does not reach the number set preliminarily, new recording of a sub-image(s) can be performed continuously.

Since the preset number of sub-image data, the number of recorded sub-image data, and the number of newly addible sub-image data are displayed in the live view display state, such an effect can be obtained that an operator can easily grasp "the remaining number of sub-images which can be photographed".

Such an effect can also be obtained that a process for file creation can be terminated easily before the preset number of sub-image data is recorded.

B2. Photographing and New File Creation Processing (Modified Example 1)

A modified example of a processing from imaging processing to file creation in the imaging apparatus 1 will be explained.

Figure 5:
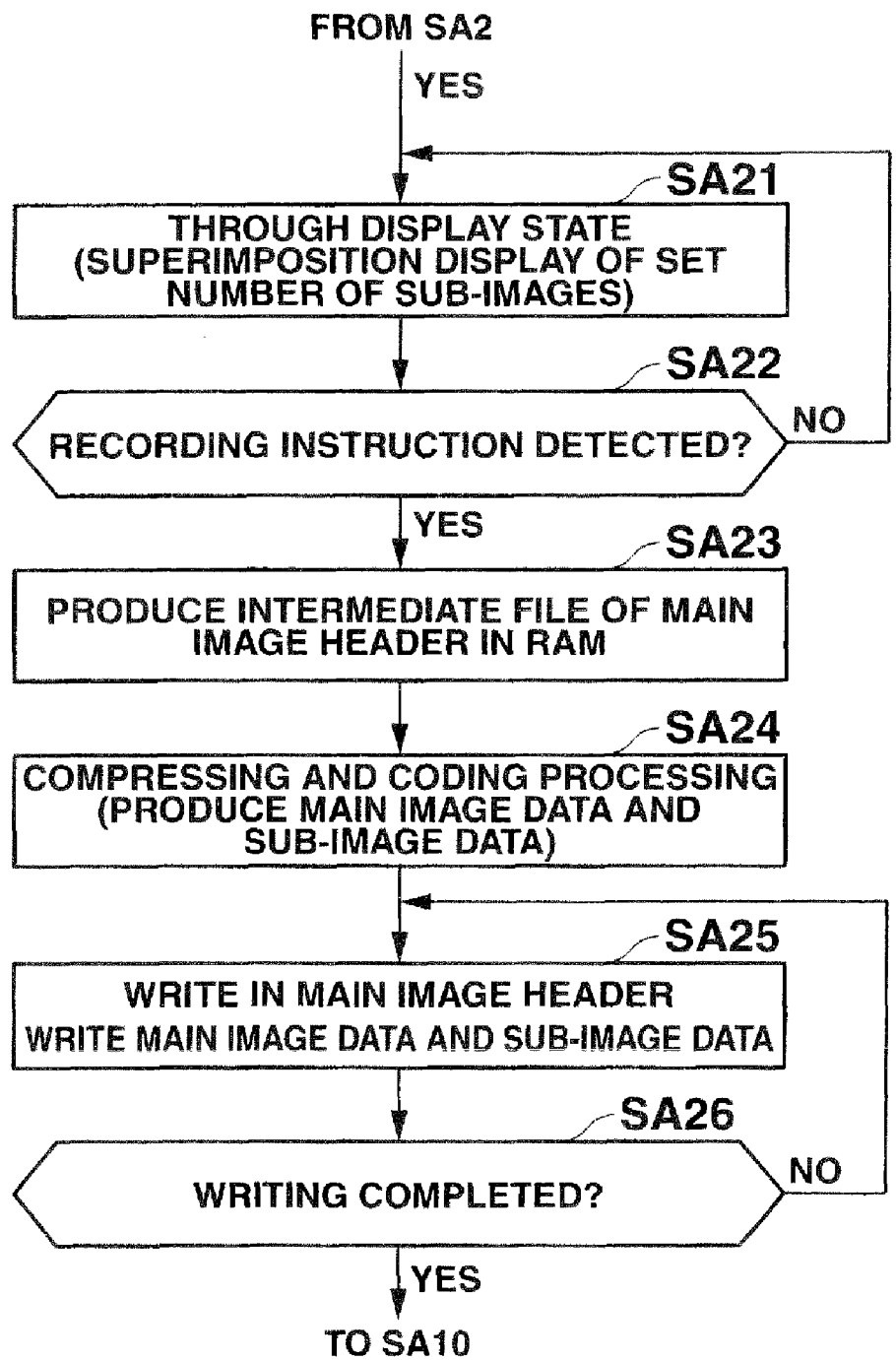
FIG. 5 is a flowchart of an imaging and new file creation processing (modified example 1) according to the embodiment of the present invention.

FIG. 5 is a flowchart showing a processing from photographing (imaging) to recording to the image recording section 8. Explanation about portions common to the circuit configuration of the imaging apparatus 1 and the flowchart of the above-mentioned B1 example will be omitted.

When determination at step SA3 in FIG. 2 is Yes, namely, a setting operation of the number of sub-images has been detected, the control section 11 displays the set number of sub-images together with an image displayed in the live view display state, as shown in FIG. 4A (step SA21).

The control section 11 waits for detection of a recording instruction of an image focused in the imaging section 3 in the live view display state (step SA22), and when the recording instruction is detected (step SA22: Yes), the control section 11 creates an intermediate file of the main image header in the RAM 10 while image data corresponding to an image focused on the imaging section 3 at the time is temporarily stored in the RAM 10 (step SA23).

The control section 11 causes the coding/decoding processing section 6 to create main image data and sub-image data corresponding to an image focused in the imaging section 3 (step SA24) and writes respective information including setting and writing of a sub-image identification IFD setting region about the created main image data and sub-image data into the main image header (step SA25), and the control section 1 determines whether or not writing has been completed (step SA26).

When writing has not been completed, the control section 11 returns back to step SA25. When the control section 11 determines that writing has been completed, the control section 11 performs step SA10 shown in FIG. 2, namely, a creation processing of a file including the main image header, main image data, and sub-image data.

FIGS. 6A to 6D show file configurations during a creation process performed according to the flowchart shown in FIG. 5.

In FIGS. 6A to 6D, configurations defined by respective reference numerals are similar to those in FIGS. 3A to 3D, and explanation thereof is therefore omitted. The content illustrated in FIG. 6A shows a time point of step SA23 of the flowchart of FIG. 5. That is, when the number of sub-images is set at step SA3, the control section 11 detects the setting, determines that a file created here is a file including main image file data and sub-image file data therein, and writes an intermediate file of a main image header corresponding to a file format of the file in the RAM 10 to ensure a storage region therein (a region enclosed by a broken line in FIG. 6A)

The content illustrated in FIG. 6B shows a state during step SA25 of the flowchart of FIG. 5. That is, when the main image data and the sub-image data are created at step SA24, thumbnail image data of the main image data is written in the thumbnail image data setting region 1011 and the main image data is written in the main image data setting region 102, respectively. When sub-image data (for example, 4 items) are created approximately simultaneously with the writing, four regions of the sub-image data setting regions, i.e., 1030 to 1034 thereof are temporarily ensured, and writing in the regions 1030 to 1031 of the four regions is performed so that the regions up to line D1 are ensured. Since the number of written sub-image data is decided, "Active" is set in the sub-image identification IFD setting regions (IFD00 to IFD01) and the regions up to line D2 are ensured.

Dummy data (0x00) is added in data setting regions for the main image data and the sub-image data in the RAM 10 to cause a start offset to coincide with a cluster boundary such that a size of each data becomes a multiple of a cluster size, so that such a drawback that a file configuration is largely rewritten due to accidental movement of data during writing is prevented.

The content illustrated in FIG. 6C shows a final state of step SA25 of the flowchart of FIG. 5. That is, writing of sub-image data during writing in FIG. 6B is performed so that four regions of the respective sub-image data setting regions, i.e., 1030 to 1033 are ensured (line E1), and "Active" is set in the sub-image identification IFD setting regions (IFD00 to IFD03) corresponding to the written sub-image data so that the regions up to line E2 are ensured.

The content illustrated in FIG. 6D shows a state of step SA26 (Yes) of the flowchart of FIG. 5. That is, in order to combine the main image header 101, the main image data setting region 102, and the sub-image data setting regions 1030 to 1033 which are completed as an intermediate file as one file, a processing for deleting dummy data is performed.

Thus, according to this flowchart, temporal reduction in the process up to the file creation can be achieved.

Accordingly, this process is effective when many image data have been created in a short time in such a process as a continuous photographing process.

B3. Photographing and New File Creation Processing (Modified Example 2)

A modified example 2 of a processing from the photographing to file creation in the imaging apparatus 1 will be explained.

Figure 7:
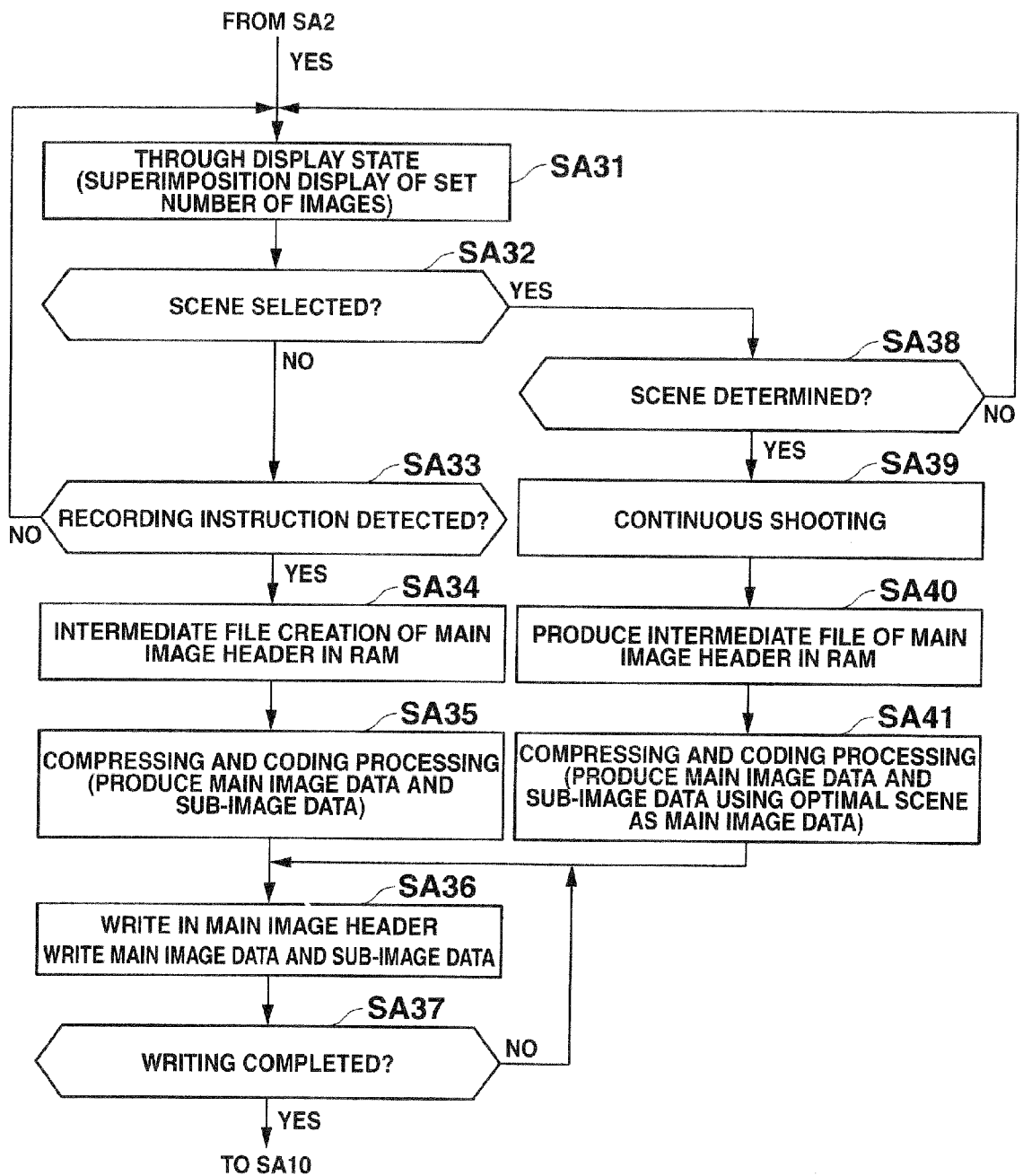
FIG. 7 is a flowchart of an imaging and new file creation processing (modified example 2) according to the embodiment of the present invention.

FIG. 7 is a flowchart showing a processing from photographing (imaging) to recording to the image recording section 8. Explanation about portions common to the circuit configuration of the imaging apparatus 1 and the flowchart of the above-mentioned B1 example and B2 example will be omitted.

In the modified example 2, the imaging apparatus 1 includes optimal photographing conditions corresponding photographing scenes such as "party", "a child (children)", and "evening sun" in the program memory 9. When a photographing scene requiring continuous shooting in these photographing scenes is selected, the scene is displayed as a through image, and when recording is instructed, the continuous shooting is performed automatically.

When the control section 11 detects "Yes" at step SA3 in FIG. 2, namely, an operation for setting the number of sub-images, the control section 11 displays the set number of images together with an image displayed in a through display state (step SA31).

In the through display state, the control section 11 determines whether or not either one of the above-mentioned plurality of photographing scenes has been preliminarily selected (step SA32). When any photographing scene has not been selected (step SA32: No), the control section 11 performs the same processing as that at steps SA22 to SA26 in the flowchart of FIG. 5 at steps SA33 to SA37.

When a photographing scene has been preliminarily selected (step SA32: Yes), the control section 11 determines whether or not a through image coincides with the selected photographing scene, for example, if the selected photographing scene is "party", the control section 11 determines whether or not the through image is an image of "party" (step SA38). When the through image does not coincide with the selected photographing scene (step SA38: No), the control section 11 returns back to step SA31. When the through image coincides with the selected photographing scene (step SA38: Yes), the control section 11 performs continuous shooting of (the set number of sub-images+the number of main images (one)) (step SA39). The control section 11 stores image data corresponding to the continuous shooting in the RAM 10 temporarily and creates an intermediate file of the main image header in the RAM 10 (step SA40).

The control section 11 causes the coding/decoding processing section 6 to create main image data and sub-image data such that an optimal scene, which is selected among an image of 10 images obtained by continuous shooting and which is most suitable for the selected photographing scene, is the main image data and the remaining other images are the sub-image data (step SA41), writes respective information including image index IFD and setting and writing of the sub-image identification IFD setting region regarding the created main image data and sub-image data in the main image header (step SA36), and determines whether the writing has been completed (step SA37). When the writing has not been completed, the control section 11 returns back to step SA36. When the control section 11 determines that the writing has been completed, the control section 11 performs step SA10 in FIG. 2, namely, a creation processing of a file including the main image header, the main image data, and the sub-image data.

Accordingly, according to the modified example 2, such an effect can be obtained that continuous shooting can be automatically performed based upon the selected photographing scene, and a file including an optimal image as main image data can be created regarding images obtained by continuous shooting.

C. Addition and Record Processing of Sub-Image Data

An addition and record processing of sub-image data in the imaging apparatus 1 will be explained.

Figure 8:
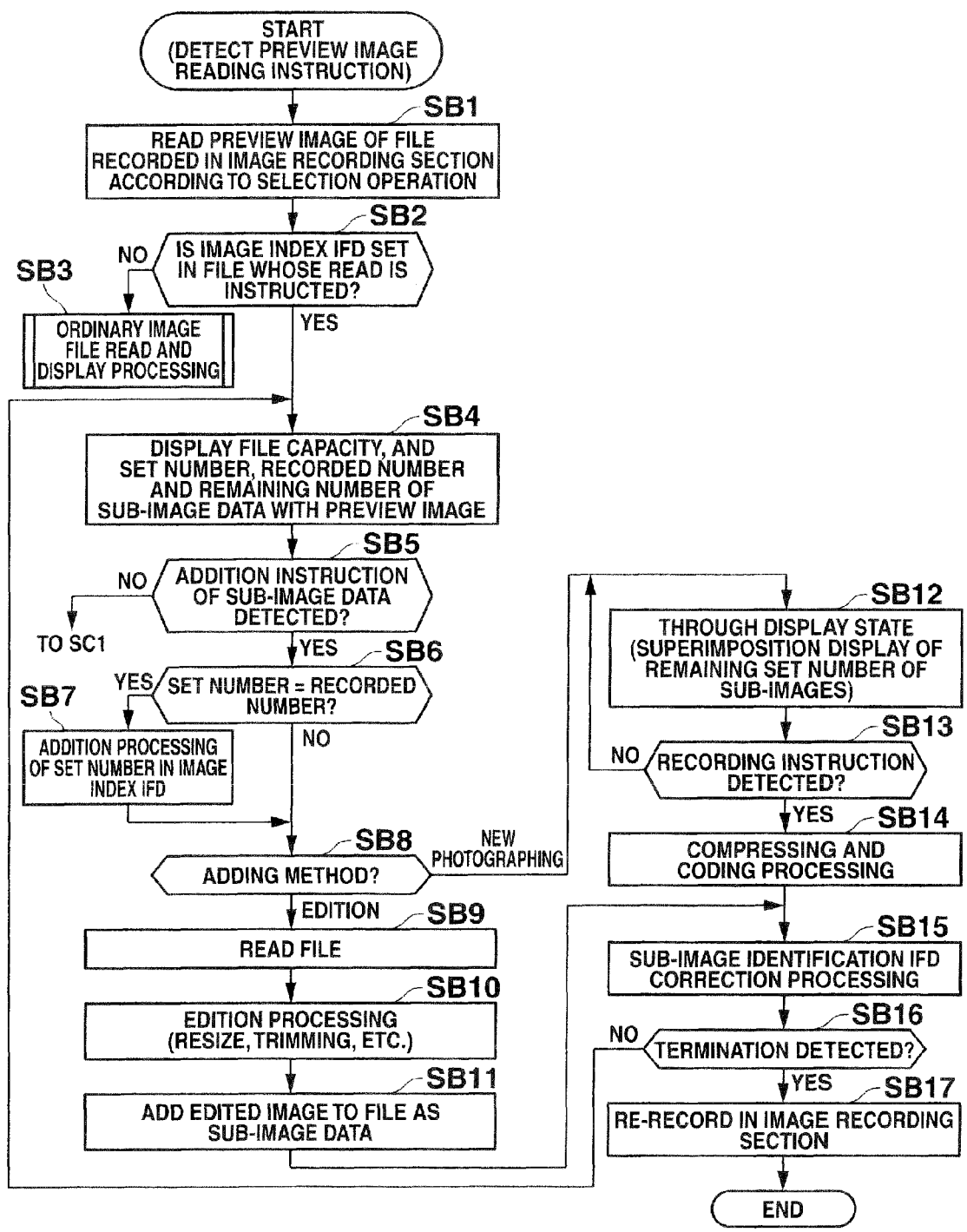
FIG. 8 is a flowchart of an additional record processing for sub-image data according to the embodiment of the present invention.

FIG. 8 is a flowchart showing an addition processing of sub-image data.

In FIG. 8, the imaging apparatus 1 operates in a photographing mode or a reproducing mode, and a state where display of images respectively stored in files recorded in the image recording section 8 (reading display of a preview image) has been instructed by detecting a predetermined operation from the key input section 13 is defined as a start state in this flowchart.

When display of an image (reading display of a preview image) is instructed, the control section 11 reads main image data from a file recorded in the image recording section 8 according to a selection operation detected by the key input section 13 (step SB1). The control section 11 determines whether or not an image index IFD 1012 has been set in the main image header 101 of the read file (step SB2).

When the control section 11 determines that the image index IFD 1012 has not been set in the main image header 101 (step SB2: No), the control section 11 proceeds to an ordinary reading and displaying processing of an image file (step SB3). When the control section 11 determines that the image index IFD 1012 has been set in the main image header 101 (step SB2: Yes), the control section 11 determines that the main image data and the sub-image data are included in the file. The control section 11 performs re-sampling (a thinning processing) of the main image data in conformity with the resolution required by the display section 12 to create a preview image, thereby causing the display section 12 to display the same.

The control section 11 reads respective information recorded in the main image header 101, respective information recorded in the sub-image header 301 of the sub-image data, and the set content in the sub-image identification IFD setting region of the image index IFD 1012 to display the capacity of the file, the set number of sub-image data, the number of recorded sub-image data, and the number of non-used sub-images (the remaining number of sub-images) based upon this information (step SB4).

Figure 9A:
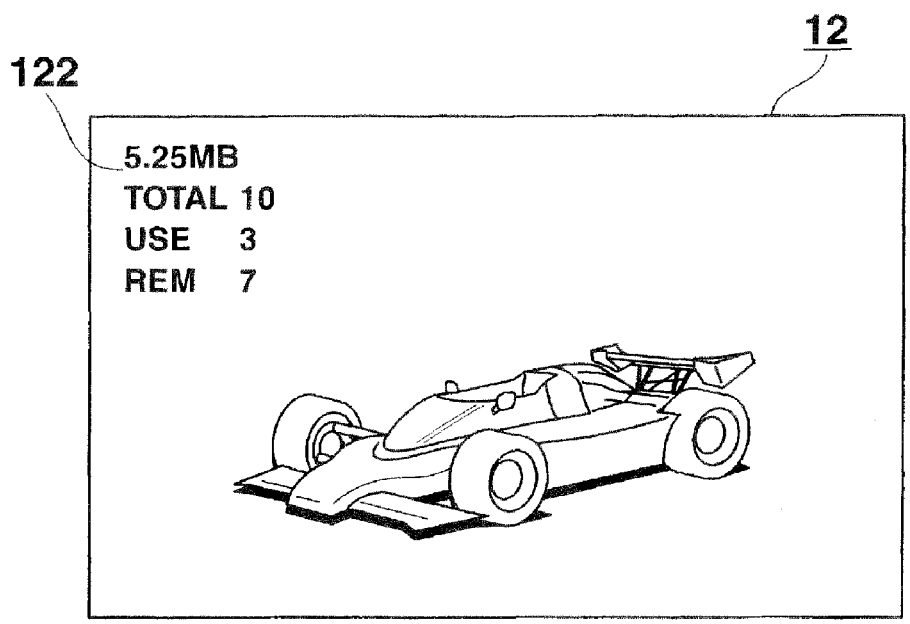
FIG. 9A is a diagram showing a display example at a time point of step SB4 of the flowchart of FIG. 8.

FIG. 9A shows a display state on the display section 12 at this time. In FIG. 9A, the capacity of the file (5.25 MB), the set number of sub-images (the number of sub-image data "Total 10"), the number of recorded sub-images (the number of sub-image data "Use 3") and the remaining number of additionally recordable sub-images (the number of sub-image data "REM 7") are displayed on the information display region 122 of the display section 12 together with display of an image of a racing car.

In this state, the control section 11 determines whether or not addition instruction of sub-image data has been determined by detection of a predetermined operation of the key input section (step SB5). When the control section 11 does not detect an addition instruction of sub-image data (step SB5: No), the control section 11 proceeds to a deletion processing (steps after step SC1) described later, but when the control section 11 detects the addition instruction of the sub-image data (step SB5: Yes), the control section 11 determines whether or not the set number=the number of recorded sub-images, namely, all on the sub-image identification IFD setting regions are "Active" or "Skip (non-display)" based upon the set content on the sub-image identification IFD setting regions (step SB6).

When all on the sub-image identification IFD setting regions are not one of "Active" or "Skip (non-display)" (step SB6: No), namely, a sub-image IFD to which "Non-use" has been set is present, the control section 11 determines that additional recording can be performed to proceed to an addition processing.

When all on the sub-image identification IFD setting regions are "Active" or "Skip (not-display)" (step SB6: Yes), the control section 11 proceeds to a processing for setting sub-image identification IFD setting regions to be set in the image index IFD 1012 by a predetermined number because the control section 11 must manage sub-image data newly (step SB7).

The control section 11 determines which of addition based upon editing of main image data or sub-image data and addition based upon new photographing (imaging) has been selected and instructed as an adding method by detection of a predetermined operation performed by the key input section 13 and/or the like (step SB8). When the addition based upon editing of the main image data or the sub-image data is selected and instructed, the control section 11 reads the main image data or the sub-image data corresponding to an image which has been displayed on the display section 12 as a preview image (step SB9) and reads an editing program stored in the program memory 9 to detect detection of a predetermined operation performed through the key input section 13 or perform automatic editing processing (step SB10).

The editing processing includes a parameter changing processing such as re-sizing, trimming, or filtering and various other processes, such as a processing for recognizing a specific image such as a face image included in image data, to perform trimming to a predetermined size. An edited image is added to a file as sub-image data according to detection of a predetermined operation performed by the key input section 13 (step SB11).

When new photographing (imaging) is selected and instructed, the control section 11 reads a program regarding an imaging processing from the program memory 9 to execute the same, causes the imaging section 3, the unit circuit 4, the image processing section 5, the RAM 10, the coding/decoding processing section 6, and the preview engine 7 to perform initial actions, and displays the set number of sub-images, the number of recorded sub-images, and the number of non-used sub-images (the remaining number of sub-images) on the display section 12 in the live view state together with images photographed periodically (step SB12).

In the live view display state, the control section 11 waits for detection of a recording instruction of an image focused on the imaging section 3 (step SB13), and when the recording instruction is detected (step SB13: Yes), the coding/decoding processing section 6 performs a compressing and decoding processing (creation of sub-image data) regarding the image focused on the imaging section 3 at this time (step SB14). When sub-image data is added to the file by the above-mentioned editing or new photographing according to the processing, the control section 11 rewrites the set content of the sub-image identification IFD setting region of the main image header 10 of the file to perform a correcting processing (step SB15).

Figure 9B:
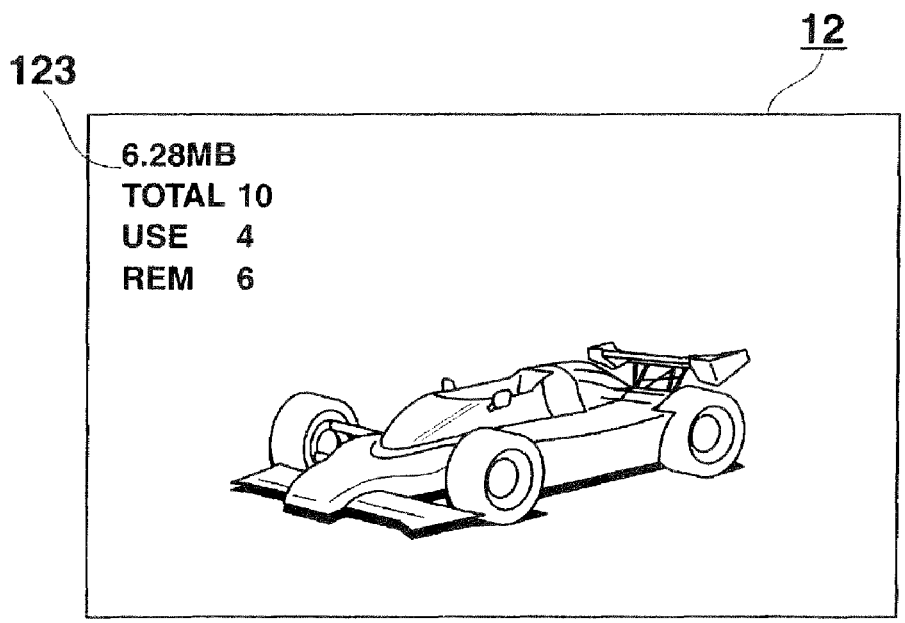
FIG. 9B is a diagram showing a display example at a time point of step SB11 of the flowchart of FIG. 8.

FIG. 9B shows a state that sub-image data has been newly added to FIG. 9A in the live view display state. FIG. 9B shows a state that sub-image data (data amount: 1.03 MB) has been added and recorded by editing or new photographing, where the capacity of the file (6.28 MB((=5.25 MB+1.03 MB)), the set number of sub-images (the number of sub-image data "Total 10") the number of recorded sub-images (the number of sub-image data "Use 4"), and the remaining number of additionally recordable sub-images (the number of sub-image data "REM 6") are displayed on the information display region 123 on the display section 12 together with an image of a racing car.

Thereafter, the control section 11 determines whether or not termination of this processing has been instructed by detecting a predetermined operation from the key input section 13 (step SB16), and unless the termination has been instructed (step SB16: No), the control section 11 proceeds to step SB4, but when the termination is instructed (step SB16: Yes), the control section 11 re-records the file in the image recording section 8 (step SB17) to terminate this processing.

Figure 10B:
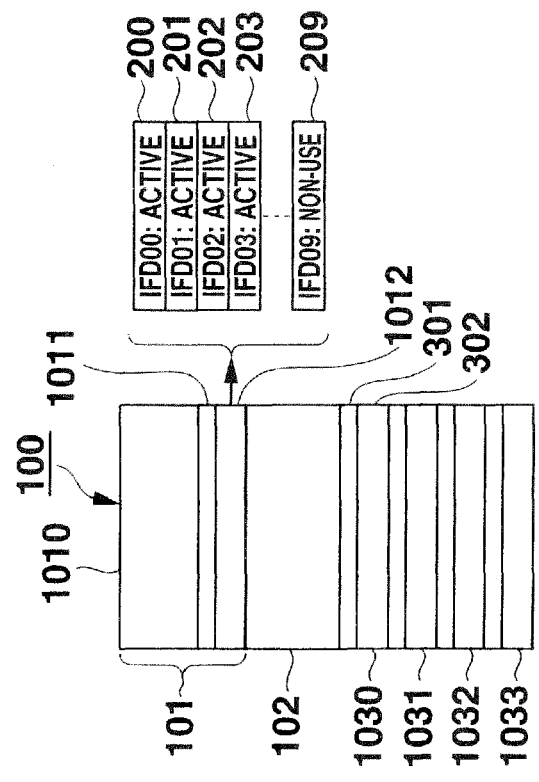
FIG. 10B is a diagram showing a file configuration at a time point of step SB15 of the flowchart of FIG. 8.
Figure 10A:
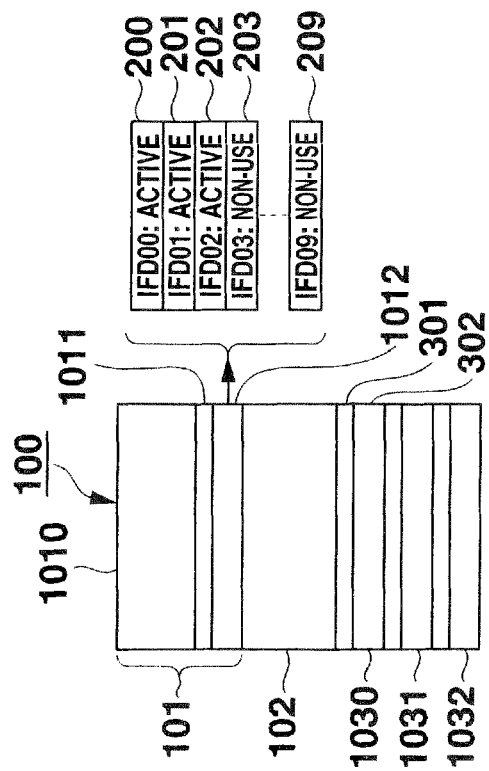
FIG. 10A is a diagram showing a file configuration before step SB4 of the flowchart of FIG. 8.

FIGS. 10A and 10B show file configurations during editing process of the file edited according to the flowchart of FIG. 8.

In FIGS. 10A and 10B, since configurations defined by respective reference numerals are similar to those in FIGS. 3A to 3D and FIGS. 6A to 6D, explanation thereof is omitted, but the content illustrated in FIG. 11A shows step SB4 of the flowchart of FIG. 8 or the step before step SB4 (the recorded state in the image recording section 8). That is, the sub-image identification IFD setting regions (IFD00 to IFD09) of the file 100 have been written in the main image header 101 and stored and reserved therein in a state that ten pieces from 200 to 209 have been preset. Since the sub-image data setting regions 1030 to 1032 have already been included in the file, "Active" has been set in the sub-image identification IFD setting regions 200 to 202 and "Non-use" has been set in the sub-image identification IFD setting regions 203 to 209 subsequent thereto.

The content illustrated in FIG. 10B shows a file configuration in step SB15 of the flowchart of FIG. 8. That is, since the sub-image data setting regions 1030 to 1033 have already been included in the file by editing or new photographing, "Active" has been set in the sub-image identification IFD setting regions 200 to 203 and "Non-use" has been set in the sub-image identification IFD setting regions 204 to 209 subsequent thereto.

Thus, according to this flowchart, when sub-image data is newly added to and recorded in a file in which sub-image data is included in the imaging apparatus, after an image based upon image data of a file to be added is displayed, addition and record can be performed by editing of sub-image data or new photographing, so that such an effect can be obtained that addition and record can be performed easily without losing association between main image data and sub-image data or between sub-image data.

When new addition should be performed, smooth transition from display of an image to an imaging processing takes place and it becomes easy to contain a recorded image as sub-image data, so that such an effect can be obtained that addition and record can be performed easily without losing association between main image data and sub-image data or between sub-image data.

In the live view display state, since the capacity of the file before addition and record is preformed thereto, the set number of sub-image data, the number of recorded sub-images, and the number of newly addible sub-image data are displayed, such an effect can be obtained that an operator can easily grasp "the remaining number of sub-images which can be further recorded".

This flowchart is based upon that the sub-image data is set in the sub-image identification IFD setting region so as to depend on the main image data, but sub-image data to be newly added can be included so as to depend from the sub-image data which has been already included in the file. In this case, information indicating that the sub-image data to be newly added is associated with the sub-image data which has already been included in the file is set in a sub-image identification IFD setting region which is newly set to "Active".

Regarding the sub-image data to be added and recorded, such a configuration can be adopted that the sub-image identification IFD No. of a sub-image identification IFD setting region for the sub-image data to be added can be set arbitrarily. In this case, the control section 11 performs a processing for newly adding and sorting (inserting) a sub-image data setting region corresponding to the arbitrarily set sub-image identification IFD No.

D. Image Data Deletion Processing

A deletion processing of image data in the imaging section 1 will be explained.

Figure 11:
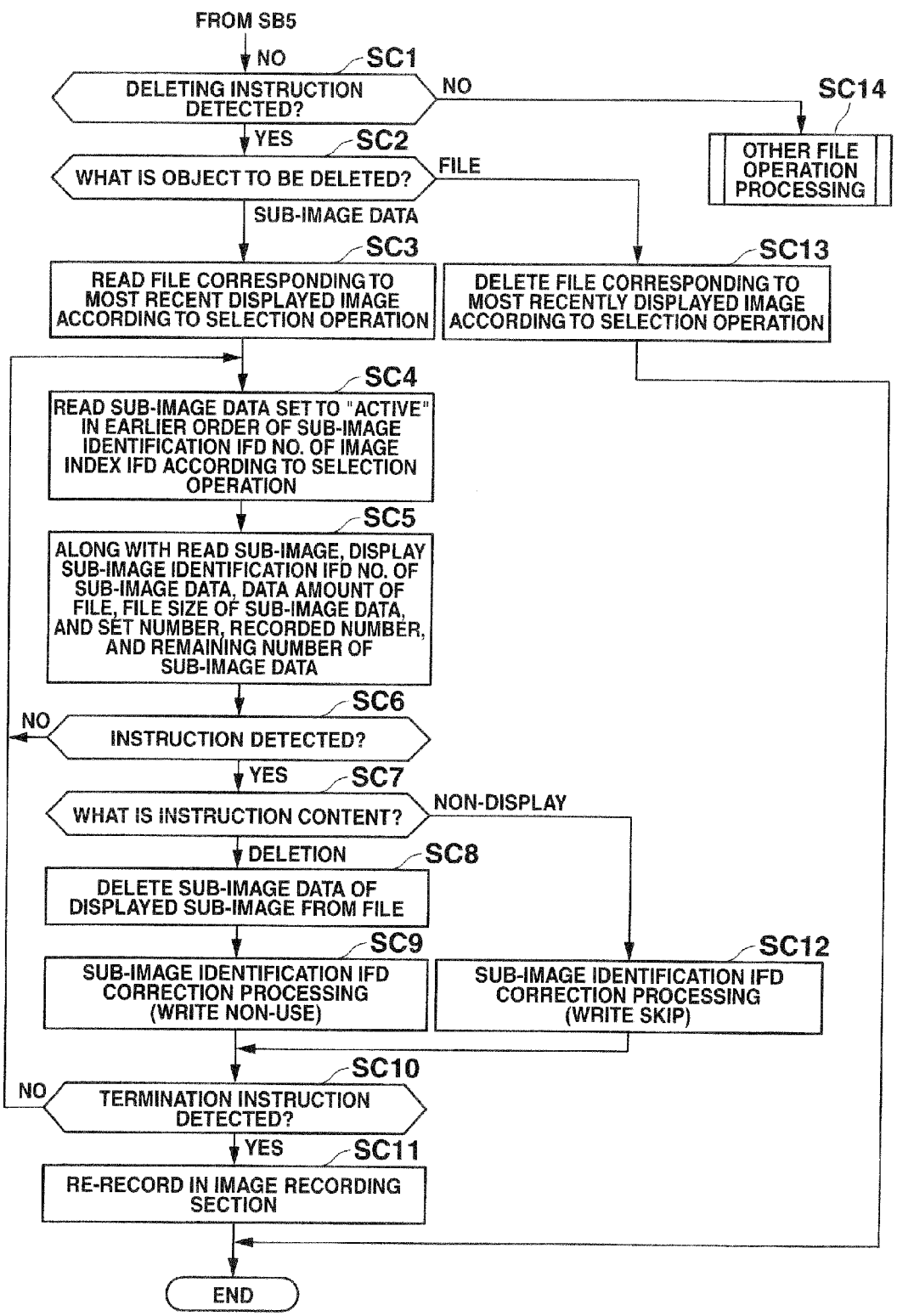
FIG. 11 is a flowchart of a deletion processing of image data according to the embodiment of the present invention.

FIG. 11 is a flowchart showing a deletion processing of image data.

FIG. 11 is a processing subsequent to No. (Number) determination at step BS5 in FIG. 8, namely, the state that it has been detected that addition and record are not performed.

The control section 11 determines whether or not a deletion instruction of image data (a file) has been detected by detection of a predetermined operation of the key input section (step SC1). When the deletion instruction has not been detected (step SC1: No), the control section 11 proceeds to another file operation processing (step SC14). When the deletion instruction is detected (step SC1: Yes), the control section 11 determines whether an object to be deleted is main image data, namely, the file itself, or sub-image data contained in the file (step SC2).

When the object to be deleted is the file, the control section 11 deletes a file corresponding to an image (a preview image) displayed on the display section 12 according to a selection instruction operation and deletion instruction operation detected at the key input section 13 to terminate this processing. When the object to be deleted is the sub-image data, the control section 11 reads a file corresponding to a most recent image displayed on the display section 12 as a preview image from the image recording section 8 (step SC3), further reads the image index IFD 1012 of the main image header 101 of the read file, and reads sub-image data set to "Active" in the numerical order of the sub-image identification IFD No. (Numbers) of the sub-image identification IFD setting regions 200 to 209 (step SC4).

Along with a sub-image corresponding to the read sub-image data, the control section 11 displays the sub-image identification IFD No. of the sub-image data corresponding to the sub-image, the data amount of the file, the file size of the sub-image data, the set number of sub-images, the number of recorded sub-images, and the number of non-used sub-Images (the remaining number of sub-images) on the display section 12 (step SC5).

Figure 12A:
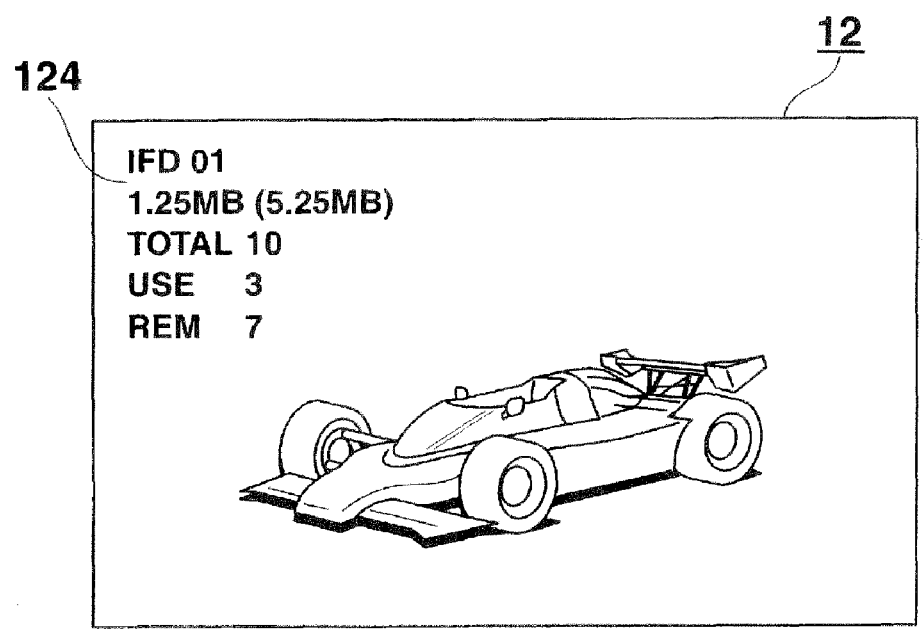
FIG. 12A is a diagram showing a display example at a time point of step SC5 of the flowchart of FIG. 11.

FIG. 12A shows a display state of the display section 12 at this time. In FIG. 12A, along with an image of a racing car, the sub-image identification IFD No. (IFD 01) of the sub-image data, the data amount of the sub-image data (1.25 MB), the file size of a file in which the sub-image data is included (5.25 MB displayed in ( ) in FIG. 12A), the set number of sub-images (the number of sub-image data "Total 10"), the number of recorded sub-images (the number of sub-image data "Use 3"), and the remaining number of additionally recordable sub-images (the number of sub-image data "REM 7") are displayed in the information display region 124 on the display section 12.

In this live view display state, the control section 11 waits for instruction content obtained by detection of a predetermined operation of the key input section 13 (step SC6), and when the instruction is not detected (step SC6: No), the control section 11 proceeds to step SC4. When the instruction is detected (step SC6: Yes), the control section 11 determines whether the instruction content is non-display or deletion (step SC7).

When the control section 11 determines that the instruction content is deletion, it deletes sub-image data about the sub-image which is being displayed on the display section from the file (step SC8), and performs a correction processing for writing "Non-use" regarding the setting content "Active" of the sub-image identification IFD setting region corresponding to the deleted sub-image data of the main image header 101 of the file (step SC9).

Thereafter, the control section 11 determines whether or not termination of the processing has been instructed by detecting a predetermined operation from the key input section 13 (step SC10). When the termination has not been instructed (step SC10: No), the control section 11 proceeds to step SC4. When the termination is instructed (step SC10: Yes), the control section 11 re-records the file in the image recording section 8 (step SC11) to terminate the processing.

On the other hand, when the control section 11 determines that the instruction content is non-display at step SC7, it performs a correction processing for writing "skip" regarding the setting content "Active" of the sub-image identification IFD setting region corresponding to the sub-image data of the sub-image which is being displayed on the display section (step SC12).

Thereafter, the control section 11 determines whether or not termination of the processing has been instructed is made by detecting a predetermined operation from the key input section 13 (step SC10). When the termination has not been instructed (step SC10: No), the control section 11 proceeds to step SC4. When the termination is instructed (step SC10: Yes), the control section 11 re-records the file in the image recording section 8 (step SB11) to terminate the processing.

Figure 12B:
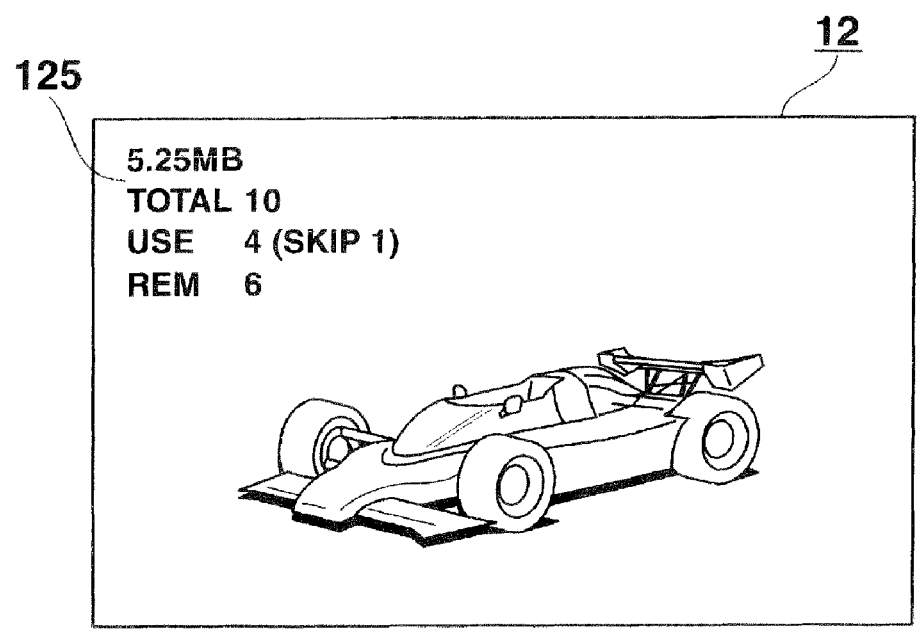
FIG. 12B is a diagram showing a display example at a time point of transition to step SC4 via step SC12 of the flowchart of FIG. 11.

FIG. 12B shows a display state of the display section 12 when the control section 11 proceeds to step SC4 via step SC12. In FIG. 12B, along with an image of a racing car, the file size (5.25 MB), the set number of sub-images (the number of sub-image data "Total 10"), the number of sub-images set to non-display (the number of sub-image data set to non-display displayed ( ) in FIG. 12B "Skip 1") of the number of recorded sub-images (the total number of recorded sub-image data "Use 4" and the number of sub-image data set to non-display "Skip 1"), and the remaining number of additionally recordable sub-images (the number of sub-image data "REM 6") are displayed in the information display region 125 on the display section 12.

FIGS. 13A to 13C show file configurations during an editing process of a file to be edited according to the flowchart of FIG. 11.

Since configurations defined by respective reference numerals in FIGS. 13A to 13C are similar to those in FIGS. 3A to 3D, FIG. 6A to 6D, and FIG. 10A and 10B, explanation thereof is omitted. The content illustrated in FIG. 13A shows step SC4 of the flowchart of FIG. 11 or the step before step SC4 (the state recorded in the image recording section 8). That is, the sub-image identification IFD setting regions (IFD00 to IFD09) of the file 100 are written in the main image header 101 to be stored and saved therein in a state that 10 pieces from 200 to 209 were preset. Since the sub-image data setting regions 1030 to 1032 are already included in the file, "Active" is set in the sub-image identification IFD setting regions 200 to 202 and "Non-use" is set in the sub-image identification IFD setting regions 203 to 209 subsequent thereto.

On the other hand, the content illustrated in FIG. 13B shows a file configuration at step SC9 of the flowchart of FIG. 11. That is, the sub-image data set in the sub-image data setting region 1032 has been deleted and the sub-image identification IFD setting region corresponding to the sub-image data setting region 1032 has been changed from "Active" to "Non-use".

The content illustrated in FIG. 13C shows a file configuration at step SC12 of the flowchart of FIG. 11. That is, the sub-image identification IFD setting region corresponding to the sub-image data setting region 1032 has been changed from "Active" to "Skip".

Thus, according to this flowchart, in a case in which a file in which the sub-image data is included is deleted in the imaging apparatus, when main image data is an object to be deleted, a file including the main image date itself is deleted from the image recording section 8 and when sub-image data is an object to be deleted, a sub-image based upon the sub-image data which is the object to be deleted is displayed and only the sub-image data can be deleted, so that such an effect can be obtained that unnecessary sub-image data can be deleted easily without losing association between the main image data and the sub-image data or sub-image data.

When it is desired to put a specific sub-image in a non-display state without deleting the sub-image, a sub-image based upon sub-image data which is a non-display object is displayed and solely the sub-image data can be set to non-display in the same manner as the above-mentioned deletion processing so that such an effect can be obtained that the sub-image data can be operated easily without losing association between the main image data and the sub-image data or sub-image data.

In the live view display state, since No. of sub-image data on which the sub-image being displayed is based, the data amount or the file size of the sub-image data, the set number of sub-image data, the number of recorded sub-image data, the number of newly addible sub-image data, and the number of sub-image data set to non-display are displayed, such an effect can be obtained that an operator can grasp "the state of the sub-image" together with an image being displayed easily.

In this embodiment, the new creation processing, the addition and record processing, and the deletion processing of a file in the imaging apparatus have been described, but the present invention is not limited to this processing and the present invention can be applied to an apparatus, a method, and a program by which a file can be newly created from imaged images, addition and record can be performed on the imaged images, and the imaged images can be edited.

D2. Image Data Deletion Processing (Modified Example)

A deletion processing (modified example) of image data in the imaging apparatus 1 will be explained.

Figure 14:
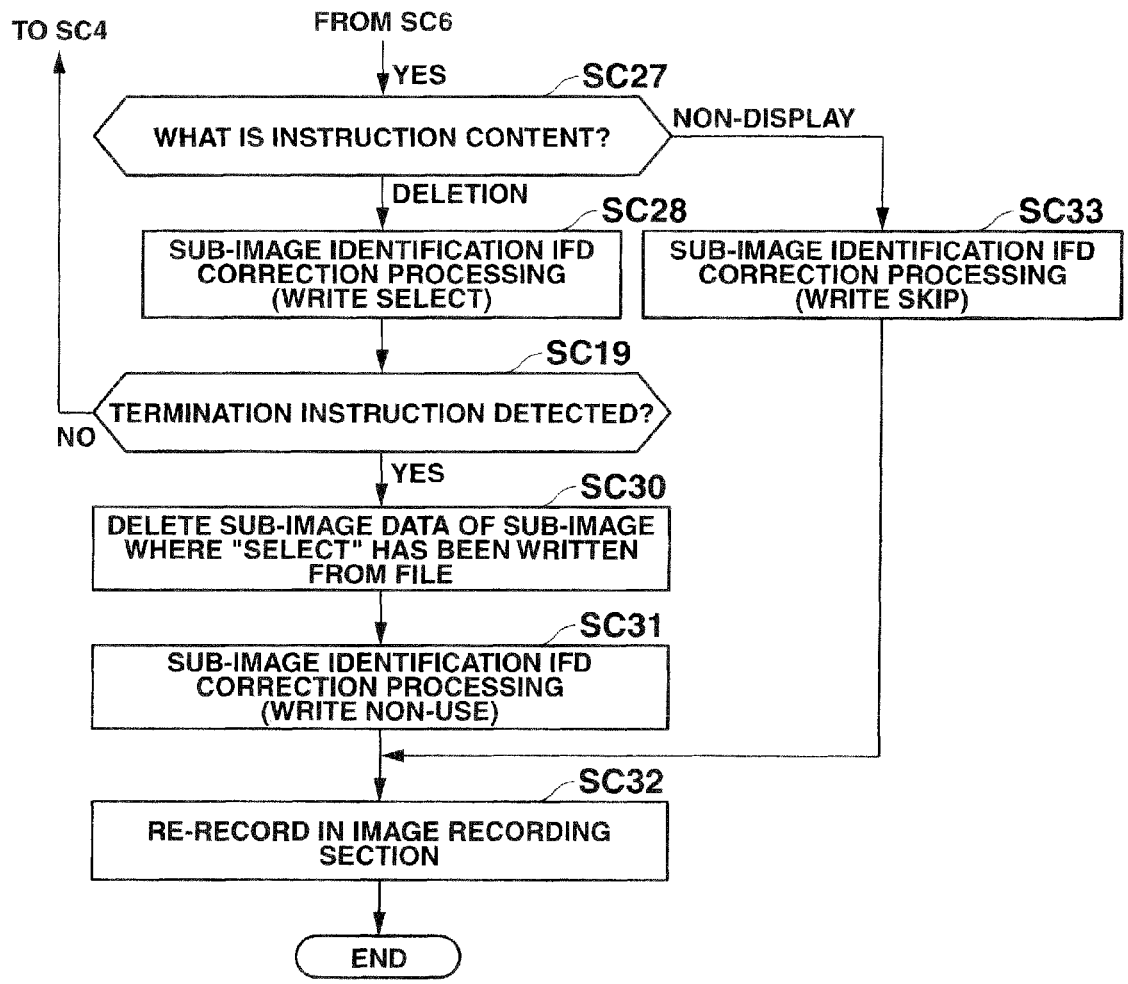
FIG. 14 is a flowchart of a deletion processing (modified example) for image data according to the embodiment of the present invention.

FIG. 14 is a flowchart showing a deletion processing (modified example) of image data.

FIG. 14 shows a processing subsequent from Yes determination at step SC6 in FIG. 11, namely, the state that a predetermined operation of the key input section 13 has been detected.

When the predetermined operation is detected at step SC6, the control section 11 determines whether or not the instruction content is deletion. When the control section 11 determines that the instruction content is a deletion instruction, it performs a correction processing for writing "Select" regarding the setting content "Active" in the sub-image identification IFD setting region corresponding to the sub-image data whose deletion has been instructed in the image index IFD1012 of the main image header 101 of the file (step SC28).

Thereafter, the control section 11 determines whether or not termination of this processing is instructed by detecting a predetermined operation from the key input section 13 (step SC29), and when the termination is not instructed (step SC29: No), the control section 11 proceeds to step SC29. On the other hand, when the termination is instructed (step SC29: Yes), regarding the sub-image where "Select" has been written at step SC28, the control section 11 deletes the sub-image data from the file (step SC30). The control section 11 performs a correction processing for writing "Non-use" regarding the setting content "Select" in the sub-image identification IFD setting region corresponding to the deleted sub-image data of the main image header 101 of the file (step SC31). Subsequently, the control section 11 re-records the file in the image recording section 8 (step SC32) to terminate this processing.

On the other hand, when the control section 11 determines that the instruction content is non-display at step SC27, the control section 11 performs a correction processing for writing "Skip" regarding the setting content "Active" in the sub-image identification IFD setting region corresponding to the sub-image data of the sub-image being displayed on the display section (step SC33). Thereafter, the control section 11 re-records the file in the image recording section 8 (step SC32) to terminate the processing.

Figure 15:
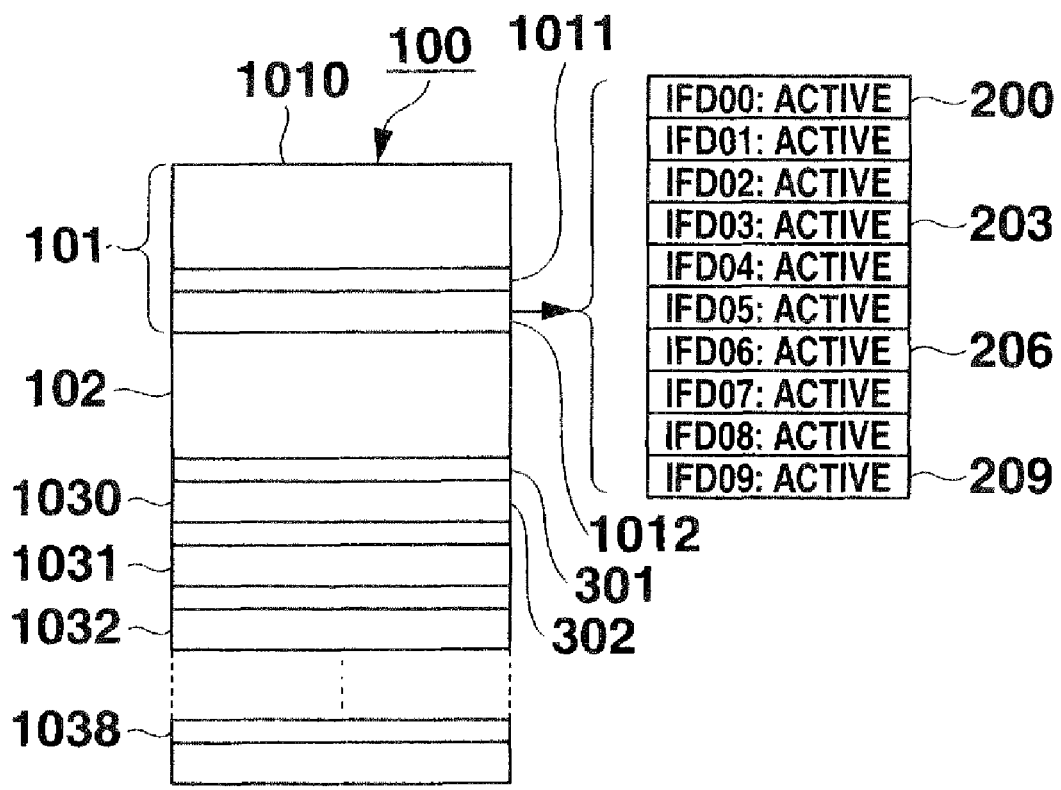
FIG. 15 is a diagram showing a file configuration at a time point of step SC28 of the flowchart of FIG. 14.

FIG. 15 shows a file configuration at step SC28 of the flowchart of FIG. 14. That is, assuming that deletion of sub-image data set in the sub-image data setting regions 1032, 1035, and 1038 is instructed, the sub-image identification IFD setting regions 203, 206, and 209 in the image index IFD 1012 corresponding to the sub-image data setting regions 1032, 1035, and 1038 are changed from "Active" to "Select".

Thus, according to the modified example of the deletion processing, when a file in which sub-image data is included is deleted in the imaging apparatus, by performing a terminating processing after instructing deletion of a plurality of sub-images, sub-images to be deleted can be collectively erased, so that such an effect can be obtained that a plurality of unnecessary sub-image data can be deleted rapidly.

In the modified example, the sub-image data which has been changed to "Select" is designated as an object to be deleted, but the present invention is not limited to this modified example and the sub-image data which has been changed to "Select" can be designated as an object to be printed out.

For example, when an image file whose printing is reserved by DPOF includes main image data and a plurality of sub-image data, such a drawback is predicted that all of these image data are printed in the conventional art.

However, according to the above-mentioned modified example, only image data arbitrarily selected by a user can be designated as an object to be printed by setting change to the above-mentioned "Select" as "selection of image data to be printed", so that such a drawback can be prevented in advance that unnecessary sub-image data is printed.

E. Modified Example of File Format

In the above-mentioned embodiment, the image index IFD 1012 is used to set and manage only the sub-image identification IFD setting regions (200 to 209), but the main image data setting region 102 may be further additionally set in the image index IFD 1012.

In this case, IFD00 in the IFD No. of the sub-image identification IFD is set as one for managing the main image data and the IFD Nos. subsequent thereto, namely, IFD01 and IFDs subsequent thereto are set as ones for managing sub-image data.

By adopting such a configuration, even if a relationship between main image data and sub-image data is rewritten at an editing time of an image file, such rewriting can be accepted merely by correcting the IFD No. of sub-image identification IFD.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means.

What is claimed is:

1. An image file processing apparatus comprising:
    an imaging unit;
    a first storage unit configured to store an image imaged by the imaging unit;
    a first data creating unit configured to create at least main image data and sub-image data from the image stored in the first storage unit;
    a second storage unit configured to store at least the main image data and the sub-image data created by the first data creating unit as one file;
    a management region setting unit configured to ensure management information of the sub-image data stored in the same file as the main image data in the second storage unit by a predetermined number and set the management information in a management region of the main image data;
    a first storage control unit configured to perform control so as to store the file based on a content set by the management region setting unit when the file is to be stored in the second storage unit;
    a second data creating unit configured to create image data from at least one of the image imaged by the imaging unit, the main image data, and the sub-image data;
    a first determining unit configured to determine whether or not the image data created by the second data creating unit can be included in the file as new sub-image data based on the number of management information set by the management region setting unit; and
    a second storage control unit configured to perform control so as to additionally store the image data created by the second data creating unit in the second storage unit as the sub-image data and to rewrite a content of the management region when the first determining unit determines that the image data can be included in the file.

2. The image file processing apparatus according to claim 1, further comprising:
    a display unit configured to display an image based on the file stored in the second storage unit; and
    a first instructing unit for instructing creation of new sub-image data regarding the image displayed by the display unit, wherein the second data creating unit creates new image data from main image data or sub-image data of the file corresponding to the image displayed by the display unit in response to an instruction from the first instructing unit.

3. The image file processing apparatus according to claim 2, further comprising:
a second display control unit configured to perform control so as to display a number of sub-image data included in a file in which image data corresponding to the image is included together with the image when the image is displayed by the display unit.

4. The image file processing apparatus according to claim 3, wherein the second display control unit further performs control so as to display a number of sub-image data corresponding to a preset region of the management region.

5. The image file processing apparatus according to claim 2, further comprising:
a first display control unit configured to perform control so as to display a capacity of a file in which image data corresponding to the image is included together with the image when the image is displayed by the display unit.

6. The image file processing apparatus according to claim 1, further comprising:
a display unit configured to display an image based on the file stored in the second storage unit;
a second instructing unit configured to instruct creation of sub-image data regarding the image displayed by the display unit; and
an imaging control unit configured to control the imaging unit to conduct imaging in order to acquire image data newly in response to an instruction from the second instructing unit,
wherein the second data creating unit creates new image data from an image obtained by the imaging control unit.

7. The image file processing apparatus according to claim 6, further comprising:
a first display control unit configured to perform control so as to display a capacity of a file in which image data corresponding to the image is included together with the image when the image is displayed by the display unit.

8. The image file processing apparatus according to claim 6, further comprising:
a second display control unit configured to perform control so as to display a number of sub-image data included in a file in which image data corresponding to the image is included together with the image when the image is displayed by the display unit.

9. The image file processing apparatus according to claim 8, wherein the second display control unit further performs control so as to display a number of sub-image data corresponding to a preset region of the management region.

10. The image file processing apparatus according to claim 1, wherein:
the first data creating unit further creates thumbnail image data from the image stored in the first storage unit, and
the sub-image data comprises data having the same resolution as a resolution of the main image data or data having a resolution larger than a resolution of the thumbnail image data and smaller than the resolution of the main image data.

11. An image file processing apparatus comprising:
an imaging unit;
a first storage unit configured to store an image imaged by the imaging unit;
a first data creating unit configured to create at least main image data and sub-image data from the image stored in the first storage unit;
a second storage unit configured to store at least the main image data and the sub-image data created by the first data creating unit as one file;
a management region setting unit configured to ensure management information of the sub-image data stored in the same file as the main image data in the second storage unit by a predetermined number and set the management information in a management region of the main image data;
a first storage control unit configured to perform control so as to store the file based on a content set by the management region setting unit when the file is to be stored in the second storage unit;
a display unit configured to display an image based on the file stored in the second storage unit;
a third instructing unit configured to instruct deletion regarding the image displayed by the display unit;
a second determining unit configured to determine whether an image whose deletion is instructed by the third instructing unit is an image based on main image data or an image based on sub-image data; and
a third storage control unit configured to perform control so as to delete the sub-image data from a file in which the sub-image data is included and to rewrite a content of the management region of the file when the second determining unit determines that the image whose deletion is instructed is the image based on the sub-image data.

12. The image file processing apparatus according to claim 11, further comprising:
a notifying unit configured to perform notification that a file in which the main image data is included itself is deleted when the second determining unit determines that the image whose deletion is instructed is the image based on the main image data;
a detecting unit configured to detect performance of deletion in response to notification performed by the notifying unit; and
a fourth storage control unit configured to perform control so as to delete the file in which the main image data corresponding to the image being displayed is stored itself from the second storage unit when the detecting unit detects the performance of deletion.

13. The image file processing apparatus according to claim 11, further comprising:
a first display control unit configured to perform control so as to display a capacity of a file in which image data corresponding to the image is included together with the image when the image is displayed by the display unit.

14. The image file processing apparatus according to claim 11, further comprising:
a second display control unit configured to perform control so as to display a number of sub-image data included in a file in which image data corresponding to the image is included together with the image when the image is displayed by the display unit.

15. The image file processing apparatus according to claim 14, wherein the second display control unit further performs control so as to display a number of sub-image data corresponding to a preset region of the management region.

16. The image file processing apparatus according to claim 11, wherein:
the first data creating unit further creates thumbnail image data from the image stored in the first storage unit, and the sub-image data comprises data having the same resolution as a resolution of the main image data or data having a resolution larger than a resolution of the thumbnail image data and smaller than the resolution of the main image data.

17. An image file processing apparatus comprising:
an imaging unit;
a first storage unit configured to store an image imaged by the imaging unit;
a first data creating unit configured to create at least main image data and sub-image data from the image stored in the first storage unit;
a second storage unit configured to store at least the main image data and the sub-image data created by the first data creating unit as one file;
a management region setting unit configured to ensure management information of the sub-image data stored in the same file as the main image data in the second storage unit by a predetermined number and set the management information in a management region of the main image data;
a first storage control unit configured to perform control so as to store the file based on a content set by the management region setting unit when the file is to be stored in the second storage unit;
a display unit configured to display an image based on image data stored in the second storage unit;
a fourth instructing unit configured to instruct non-display regarding the image displayed by the display unit;
a third determining unit configured to determine whether an image whose non-display is instructed by the third instructing unit is an image based on main image data or an image based on sub-image data; and
a fifth storage control unit configured to perform control so as to write information for setting the image based on the sub-image data in a non-display state into a management region of a file in which the sub-image data is included when the third determining unit determines that the image whose non-display is instructed is the image based on the sub-image data.

18. The image file processing apparatus according to claim 17, further comprising:
a first display control unit configured to perform control so as to display a capacity of a file in which image data corresponding to the image is included together with the image when the image is displayed by the display unit.

19. The image file processing apparatus according to claim 17, further comprising:
a second display control unit configured to perform control so as to display a number of sub-image data included in a file in which image data corresponding to the image is included together with the image when the image is displayed by the display unit.

20. The image file processing apparatus according to claim 19, wherein the second display control unit further performs control so as to display a number of sub-image data corresponding to a preset region of the management region.

21. The image file processing apparatus according to claim 17, wherein:
the first data creating unit further creates thumbnail image data from the image stored in the first storage unit, and
the sub-image data comprises data having the same resolution as a resolution of the main image data or data having a resolution larger than a resolution of the thumbnail image data and smaller than the resolution of the main image data.

22. An image file processing apparatus comprising:
an imaging unit;
a first storage unit configured to store an image imaged by the imaging unit;
a first data creating unit configured to create at least main image data and sub-image data from the image stored in the first storage unit;
a second storage unit configured to store at least the main image data and the sub-image data created by the first data creating unit as one file;
a management region setting unit configured to ensure management information of the sub-image data stored in the same file as the main image data in the second storage unit by a predetermined number and set the management information in a management region of the main image data;
a first storage control unit configured to perform control so as to store the file based on a content set by the management region setting unit when the file is to be stored in the second storage unit;
a display unit configured to display an image based on image data stored in the second storage unit;
a selecting unit configured to select one of deletion and non-display regarding the image displayed by the display unit;
a fifth instructing unit configured to instruct deletion regarding the image displayed by the display unit when the selecting unit selects the deletion;
a fourth determining unit configured to determine whether an image whose deletion is instructed by the fifth instructing unit is an image based on main image data or an image based on sub-image data;
a sixth storage control unit configured to perform control so as to delete the sub-image data from a file in which the sub-image data is included and to rewrite a content of the management region of the file when the fourth determining unit determines that the image whose deletion is instructed is the image based on the sub-image data;
a sixth instructing unit configured to instruct non-display regarding the image displayed by the display unit when the selecting unit selects the non-display;
a fifth determining unit configured to determine whether an image whose non-display is instructed by the sixth instructing unit is an image based on main image data or an image based on sub-image data; and
a seventh storage control unit configured to perform control so as to write information for setting the image based on the sub-image data in a non-display state into the management region of a file in which the sub-image data is included when the fifth determining unit determines that the image whose non-display is instructed is the image based on the sub-image data.

23. The image file processing apparatus according to claim 22, further comprising:
a notifying unit configured to perform notification that a file in which the main image data is included itself is deleted when the fourth determining unit determines that the image whose deletion is instructed is the image based on the main image;
a detecting unit configured to detect performance of deletion in response to notification performed by the notifying unit; and
an eighth storage control unit configured to perform control so as to delete the file in which the main image data corresponding to the image being displayed is stored itself from the second storage unit when the detecting unit detects the performance of deletion.

24. The image file processing apparatus according to claim 22, further comprising:
a first display control unit configured to perform control so as to display a capacity of a file in which image data corresponding to the image is included together with the image when the image is displayed by the display unit.

25. The image file processing apparatus according to claim 22, further comprising:
a second display control unit configured to perform control so as to display a number of sub-image data included in a file in which image data corresponding to the image is included together with the image when the image is displayed by the display unit.

26. The image file processing apparatus according to claim 25, wherein the second display control unit further performs control so as to display a number of sub-image data corresponding to a preset region of the management region.

27. The image file processing apparatus according to claim 22, wherein:
the first data creating unit further creates thumbnail image data from the image stored in the first storage unit, and
the sub-image data comprises data having the same resolution as a resolution of the main image data or data having a resolution larger than a resolution of the thumbnail image data and smaller than the resolution of the main image data.

28. An image file processing method comprising:
a first storage step of storing a captured image into a first memory;
a first data creating step of creating at least main image data and sub-image data from the image stored by the first storage step;
a second storage step of storing at least the main image data and the sub-image data created by the first data creating step as one file into a second memory; and
a management region setting step of ensuring management information of the sub-image data stored in the same file as the main image data by the second storage step by a predetermined number and of setting the management information in a management region of the main image data;
wherein the second storage step stores the file based on a content set by the management region setting step when the file is to be stored in the second memory; and
wherein the method further comprises:
a second data creating step of creating image data from at least one of the captured image, the main image data, and the sub-image data;
a first determining step of determining whether or not the image data created by the second data creating step can be included in the file as new sub-image data based on the number of management information set by the management region setting step; and
a third storage step of performing control so as to additionally store the image data created by the second data creating step in the second memory as the sub-image data and to rewrite a content of the management region when the first determining unit determines that the created image data can be included in the file.

29. An image file processing method comprising:
a first storage step of storing a captured image into a first memory;
a first data creating step of creating at least main image data and sub-image data from the image stored by the first storage step;
a second storage step of storing at least the main image data and the sub-image data created by the first data creating step as one file into a second memory; and
a management region setting step of ensuring management information of the sub-image data stored in the same file as the main image data by the second storage step by a predetermined number and of setting the management information in a management region of the main image data;
wherein the second storage step stores the file based on a content set by the management region setting step when the file is to be stored in the second memory; and
wherein the method further comprises:
a display step of displaying an image based on the file stored in the second memory;
a first instructing step of instructing deletion regarding the image displayed by the display step;
a second determining step of determining whether an image whose deletion is instructed by the first instructing step is an image based on main image data or an image based on sub-image data; and
a fourth storage control step of performing control so as to delete the sub-image data from a file in which the sub-image data is included and to rewrite a content of the management region of the file when the second instructing step determines that the image whose deletion is instructed is the image based on the sub-image data.

30. An image file processing method comprising:
a first storage step of storing a captured image into a first memory;
a first data creating step of creating at least main image data and sub-image data from the image stored by the first storage step;
a second storage step of storing at least the main image data and the sub-image data created by the first data creating step as one file into a second memory; and
a management region setting step of ensuring management information of the sub-image data stored in the same file as the main image data by the second storage step by a predetermined number and of setting the management information in a management region of the main image data;
wherein the second storage step stores the file based on a content set by the management region setting step when the file is to be stored in the second memory; and
wherein the method further comprises:
a display step of displaying an image based on the file stored in the second memory;
a second instructing step of instructing non-display regarding the image displayed by the display step;
a third determining strep of determining whether an image whose non-display is instructed by the second instructing unit is an image based on main image data or an image based on sub-image data; and
a fifth storage control step of performing control so as to write information for setting the image based on the sub-image data in a non-display state into a management region of a file in which the sub-image data is included when the third determining step determines that the image whose non-display is instructed is the image based on the sub-image data.

31. An image file processing method comprising:
a first storage step of storing a captured image into a first memory;
a first data creating step of creating at least main image data and sub-image data from the image stored by the first storage step;

a second storage step of storing at least the main image data and the sub-image data created by the first data creating step as one file into a second memory; and a management region setting step of ensuring management information of the sub-image data stored in the same file as the main image data by the second storage step by a predetermined number and of setting the management information in a management region of the main image data;

wherein the second storage step stores the file based on a content set by the management region setting step when the file is to be stored in the second memory; and wherein the method further comprises:

a display step of displaying an image based on the file stored in the second memory;

a selecting step of selecting one of deletion and non-display regarding the image displayed by the display step;

a first instructing step of instructing deletion regarding the image displayed by the display step when the selecting step selects the deletion;

a fourth determining step of determining whether an image whose deletion is instructed by the first instructing step is an image based on main image data or an image based on sub-image data;

a sixth storage control step of performing control so as to delete the sub-image data from a file in which the sub-image data is included and to rewrite a content of the management region of the file when the fourth determining step determines that the image whose deletion is instructed is the image based on the sub-image data;

a second instructing step of instructing non-display regarding the image displayed by the display step when the selecting step selects the non-display;

a fifth determining step of determining whether an image whose non-display is instructed by the second instructing step is an image based on main image data or an image based on sub-image data; and a seventh storage control step of performing control so as to write information for setting the image based on the sub-image data in a non-display state into the management region of a file in which the sub-image data is included when the fifth determining step determines that the image whose non-display is instructed is the image based on the sub-image data.

32. A non-transitory computer readable medium having stored thereon a computer program for causing a computer of an image file processing apparatus to function as units including:

a first storage unit configured to store a captured image into a first memory;

a first data creating unit configured to create at least main image data and sub-image data from the image stored by the first storage unit;

a second storage unit configured to store at least the main image data and the sub-image data created by the first data creating unit as one file into a second memory; and a management region setting unit configured to ensure management information of the sub-image data stored in the same file as the main image data by the second storage unit by a predetermined number and to set the management information in a management region of the main image data;

wherein the second storage unit performs control so as to store the file based on a content set by the management region setting unit when the file is to be stored in the second memory; and wherein the program further causes the computer to function as units including:

a second data creating unit configured to create image data from at least one of the captured image, the main image data, and the sub-image data;

a first determining unit configured to determine whether or not the image data created by the second data creating unit can be included in the file as new sub-image data based on the number of management information set by the management region setting unit; and a third storage unit configured to perform control so as to additionally store the image data created by the second data creating unit in the second memory as the sub-image data and to rewrite a content of the management region when the first determining unit determines that the image data created by the second data creating unit can be included in the file.

33. A non-transitory computer readable medium having stored thereon a computer program for causing a computer of an image file processing apparatus to function as units including:

a first storage unit configured to store an image imaged by the imaging unit;

a first data creating unit configured to create at least main image data and sub-image data from the image stored in the first storage unit;

a second storage unit configured to store at least the main image data and the sub-image data created by the first data creating unit as one file;

a management region setting unit configured to ensure management information of the sub-image data stored in the same file as the main image data in the second storage unit by a predetermined number and set the management information in a management region of the main image data;

wherein the second storage unit performs control so as to store the file based on a content set by the management region setting unit when the file is to be stored in the second memory; and wherein the program further causes the computer to function as units including:

a display unit configured to display an image based on the file stored in the second memory;

a first instructing unit for instructing deletion regarding the image displayed by the display unit;

a second determining unit configured to determine whether an image whose deletion is instructed by the first instructing unit is an image based on main image data or an image based on sub-image data; and a fourth storage control unit configured to perform control so as to delete the sub-image data from a file in which the sub-image data is included and to rewrite a content of the management region of the file when the second determining unit determines that the image whose deletion is instructed is the image based on the sub-image data.

34. A non-transitory computer readable medium having stored thereon a computer program for causing a computer of an image file processing apparatus to function as units including:

a first storage unit configured to store an image imaged by the imaging unit;

a first data creating unit configured to create at least main image data and sub-image data from the image stored in the first storage unit;

a second storage unit configured to store at least the main image data and the sub-image data created by the first data creating unit as one file;

a management region setting unit configured to ensure management information of the sub-image data stored in the same file as the main image data in the second storage unit by a predetermined number and set the management information in a management region of the main image data;

wherein the second storage unit performs control so as to store the file based on a content set by the management region setting unit when the file is to be stored in the second memory; and wherein the program further causes the computer to function as units including:

a display control unit configured to display an image based on the file stored in the second memory;

a second instruction detecting unit configured to instruct non-display regarding the image displayed by the display unit;

a third determining unit configured to determine whether an image whose non-display is detected by the second instruction detecting unit is an image based on main image data or an image based on sub-image data; and a fifth storage control unit configured to perform control so as to write information for setting the image based on the sub-image data in a non-display state into a management region of a file in which the sub-image data is included when the third determining unit determines that the image whose non-display is detected is the image based on the sub-image data.

35. A non-transitory computer readable medium having stored thereon a computer program for causing a computer of an image file processing apparatus to function as units including:

a first storage unit configured to store an image imaged by the imaging unit;

a first data creating unit configured to create at least main image data and sub-image data from the image stored in the first storage unit;

a second storage unit configured to store at least the main image data and the sub-image data created by the first data creating unit as one file;

a management region setting unit configured to ensure management information of the sub-image data stored in the same file as the main image data in the second storage unit by a predetermined number and set the management information in a management region of the main image data;

wherein the second storage unit performs control so as to store the file based on a content set by the management region setting unit when the file is to be stored in the second memory; and wherein the program further causes the computer to function as units including:

a display control unit configured to display an image based on the file stored in the second memory;

a selecting unit configured to select one of deletion and non-display regarding the image displayed by the display unit;

a first instructing unit configured to instruct deletion regarding the image displayed by the display unit when the selecting unit selects the deletion of the image;

a fourth determining unit configured to determine whether an image whose deletion is instructed by the first instructing unit is an image based on main image data or an image based on sub-image data;

a sixth storage control unit configured to perform control so as to delete the sub-image data from a file in which the sub-image data is included and to rewrite a content of the management region of the file when the fourth determining unit determines that the image whose deletion is instructed is the image based on the sub-image data;

a second instructing unit configured to instruct non-display regarding the image displayed by the display unit when the selecting unit selects the non-display;

a fifth determining unit configured to determine whether an image whose non-display is instructed by the second instructing unit is an image based on main image data or an image based on sub-image data; and a seventh storage control unit configured to perform control so as to write information for setting the image based on the sub-image data in a non-display state into the management region of a file in which the sub-image data is included when the fifth determining unit determines that the image whose non-display is instructed is the image based on the sub-image data.

* * * * *